US011252393B2

(12) United States Patent
Petrangeli et al.

(10) Patent No.: US 11,252,393 B2
(45) Date of Patent: Feb. 15, 2022

(54) TRAJECTORY-BASED VIEWPORT PREDICTION FOR 360-DEGREE VIDEOS

(71) Applicant: Adobe Inc., San Jose, CA (US)

(72) Inventors: Stefano Petrangeli, San Jose, CA (US); Viswanathan Swaminathan, Saratoga, CA (US); Gwendal Brieuc Christian Simon, San Carlos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/074,189

(22) Filed: Oct. 19, 2020

(65) Prior Publication Data

US 2021/0037227 A1 Feb. 4, 2021

Related U.S. Application Data

(63) Continuation of application No. 16/421,276, filed on May 23, 2019, now Pat. No. 10,848,738.

(51) Int. Cl.
*H04N 13/194* (2018.01)
*H04N 13/376* (2018.01)

(52) U.S. Cl.
CPC ......... *H04N 13/194* (2018.05); *H04N 13/376* (2018.05)

(58) Field of Classification Search
CPC .................. H04N 13/194; H04N 13/376
USPC ........................................... 348/39
See application file for complete search history.

(56) References Cited

U.S. PATENT DOCUMENTS

| 6,111,582 A | * | 8/2000 | Jenkins | ................... G06T 15/40 |
| | | | | 345/421 |
| 10,848,738 B1 | | 11/2020 | Petrangeli et al. | |
| 2018/0124312 A1 | * | 5/2018 | Chang | ................... H04N 19/46 |
| 2019/0250622 A1 | * | 8/2019 | Nister | ................ G06K 9/00825 |
| 2020/0374506 A1 | | 11/2020 | Petrangeli et al. | |

OTHER PUBLICATIONS

"Corrected Notice of Allowability", U.S. Appl. No. 16/421,276, dated Sep. 3, 2020, 2 pages.
"Notice of Allowance", U.S. Appl. No. 16/421,276, dated Jul. 15, 2020, 9 pages.

(Continued)

*Primary Examiner* — Christopher S Kelley
*Assistant Examiner* — Asmamaw G Tarko
(74) *Attorney, Agent, or Firm* — FIG. 1 Patents

(57) ABSTRACT

In implementations of trajectory-based viewport prediction for 360-degree videos, a video system obtains trajectories of angles of users who have previously viewed a 360-degree video. The angles are used to determine viewports of the 360-degree video, and may include trajectories for a yaw angle, a pitch angle, and a roll angle of a user recorded as the user views the 360-degree video. The video system clusters the trajectories of angles into trajectory clusters, and for each trajectory cluster determines a trend trajectory. When a new user views the 360-degree video, the video system compares trajectories of angles of the new user to the trend trajectories, and selects trend trajectories for a yaw angle, a pitch angle, and a roll angle for the user. Using the selected trend trajectories, the video system predicts viewports of the 360-degree video for the user for future times.

20 Claims, 7 Drawing Sheets

(56) References Cited

OTHER PUBLICATIONS

Atev, Stefan et al., "Clustering of Vehicle Trajectories", IEEE Transactions on Intelligent Transportation Systems, Oct. 2010, 11 pages.
Bao, Yanan et al., "Motion-Prediction-Based Multicast for 360-Degree Video Transmissions", Jun. 2017, 9 pages.
Bao, Yanan et al., "Shooting a Moving Target: Motion-Prediction-Based Transmission for 360-Degree Videos", In IEEE Int. Conf. on Big Data (Big Data), 2016., Dec. 2016, 10 pages.
Corbillon, Xavier et al., "360-Degree Video Head Movement Dataset", Jun. 2017, 6 pages.
Corbillon, Xavier et al., "Optimal Set of 360-Degree Videos for Viewport-Adaptive Streaming", In ACM Conf. on Multimedia (MM), 2017, Oct. 2017, pp. 943-951.
Lo, Wen-Chih et al., "360 Video Viewing Dataset in Head-Mounted Virtual Reality", In ACM Conf. on Multimedia Systems (MMSys), 2017., Jun. 2017, 6 pages.
Ng, Andrew Y. et al., "On Spectral Clustering: Analysis and an Algorithm", Apr. 2002, 8 pages.
Petrangeli, Stefano et al., "Improving Virtual Reality Streaming using HTTP/2", In ACM Conf. on Multimedia Systems (MMSys), 2017, Jun. 2017, 4 pages.
Qian, Feng et al., "Optimizing 360 Video Delivery Over Cellular Networks", Oct. 7, 2016, 6 pages.
Zhou, Chao , "A Measurement Study of Oculus 360 Degree Video Streaming", Jun. 20, 2017, 11 pages.

\* cited by examiner

TRAJECTORY-BASED VIEWPORT PREDICTION FOR 360-DEGREE VIDEOS

RELATED APPLICATIONS

This application claims priority as a continuation of U.S. patent application Ser. No. 16/421,276, filed May 23, 2019, and titled "Trajectory-based Viewport Prediction for 360-Degree Videos," the entire disclosure of which is hereby incorporated by reference.

BACKGROUND

Videos in which views in multiple directions are simultaneously recorded (e.g., using an omnidirectional camera or multiple cameras) are referred to as 360-degree videos, immersive videos, or spherical videos, and are used in virtual reality, gaming, and playback situations where a viewer can control his or her viewing direction. The part of a 360-degree video being viewed by a viewer during playback of the 360-degree video is referred to as the viewport, and changes as the viewer changes his or her viewing direction. For instance, when playing a video game that allows a viewer to immerse themselves in the 360-degree video using virtual reality, the viewport corresponding to the viewer may change to display a different portion of the 360-degree video based on the viewer's movements within the video game.

When delivering a 360-degree video, such as when a server delivers the 360-degree video to a client device over a network, the portion of the 360-degree video corresponding to a current viewport is often delivered at a higher quality (e.g., a higher bit-rate of source encoding) than other portions of the 360-degree video to reduce the bandwidth requirements needed to deliver the 360-degree video. For instance, the 360-degree video can be encoded at different qualities and spatially divided into tiles. During the streaming session, the client device can request the tiles corresponding to the current viewport at the highest qualities. Consequently, when a user changes the viewport of the 360-degree video, such as by moving during playback of the 360-degree video, the user may experience a degradation in the video quality at the transitions of the viewport caused by different encoding qualities of the different portions of the 360-degree video. Hence, many video systems not only request a current viewport for a user at a higher quality, but also predict a future viewport for the user and request the predicted viewport (e.g., tiles of the 360-degree video corresponding to the predicted viewport) at a higher quality than other portions of the 360-degree video to minimize the transitions in quality experienced by the user as they change the viewport. This technique is sometimes referred to as viewport-based adaptive streaming.

Conventional systems that perform viewport-based adaptive streaming are limited to predicting user viewports for short-term time horizons, typically on the order of milliseconds, and almost always less than a couple seconds. However, most devices that process and display 360-degree videos are equipped with video buffers having much longer delays than the short-term time horizons of conventional systems that perform viewport-based adaptive streaming. For instance, it is not uncommon for a client device that displays 360-degree videos to include video buffers having 10-15 seconds worth of storage. Moreover, conventional systems that are limited to predicting user viewports for short-term time horizons do not scale to long-term horizons, since these conventional systems usually rely just on physical movements of a user, and often model these movements using second-order statistics which simply do not include the information needed for long-term time horizons corresponding to the delays of video buffers in client devices.

Hence, conventional systems that perform viewport-based adaptive streaming are not efficient because when a video buffer with a long-term time horizon (e.g., 10-15 seconds) is used, these conventional systems suffer from quality degradation as the user moves, due to the poor performance of short-term (e.g., a few seconds) based prediction algorithms. Conversely, when a video buffer with a short-term time horizon (e.g., 2-3 seconds) is used, the short-term based prediction algorithms may be effective at predicting a user viewport for the short-term time horizon, but delivery of the 360-degree video is more susceptible to bandwidth fluctuations that cause video freezes and other quality degradations. Accordingly, these conventional systems yield poor viewing experiences for users.

SUMMARY

Techniques and systems are described for trajectory-based viewport prediction for 360-degree videos. A video system obtains trajectories of angles as related to a user's viewing angle, and determines the user's viewport of the 360-degree video over time. For instance, the trajectories of the angles may include trajectories for a yaw angle, a pitch angle, and a roll angle of a user's head recorded as the user views the 360-degree video for users who have previously viewed the 360-degree video. The video system clusters the trajectories of angles into trajectory clusters based on a mutual distance between pairs of trajectories, and determines for each cluster a trend trajectory that represents the trajectories of the trajectory cluster (e.g., an average trajectory for the trajectory cluster) and a score threshold that represents the mutual distances for the pairs of trajectories of the trajectory cluster. When a new user views the 360-degree video, the video system compares trajectories of angles of the new user recorded during a time frame of the 360-degree video to the trend trajectories, and selects trend trajectories for a yaw angle, a pitch angle, and a roll angle for the user based on the comparison and the score thresholds.

Using the selected trend trajectories for yaw, pitch, and roll angles, the video system predicts viewports of the 360-degree video for the user for future times (e.g., later times than the time frame of the 360-degree video used for the comparison). Hence, the video system predicts a user's viewport of a 360-degree video based on patterns of past viewing behavior of the 360-degree video, e.g., how other users viewed the 360-degree video. Accordingly, the video system can accurately predict a user's viewport for long-term time horizons (e.g., 10-15 seconds) that correspond to a device's video buffer delay, so that the 360-degree video can be efficiently delivered to a device and viewed without undesirable transitions in display quality as the user changes his or her viewport of the 360-degree video.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
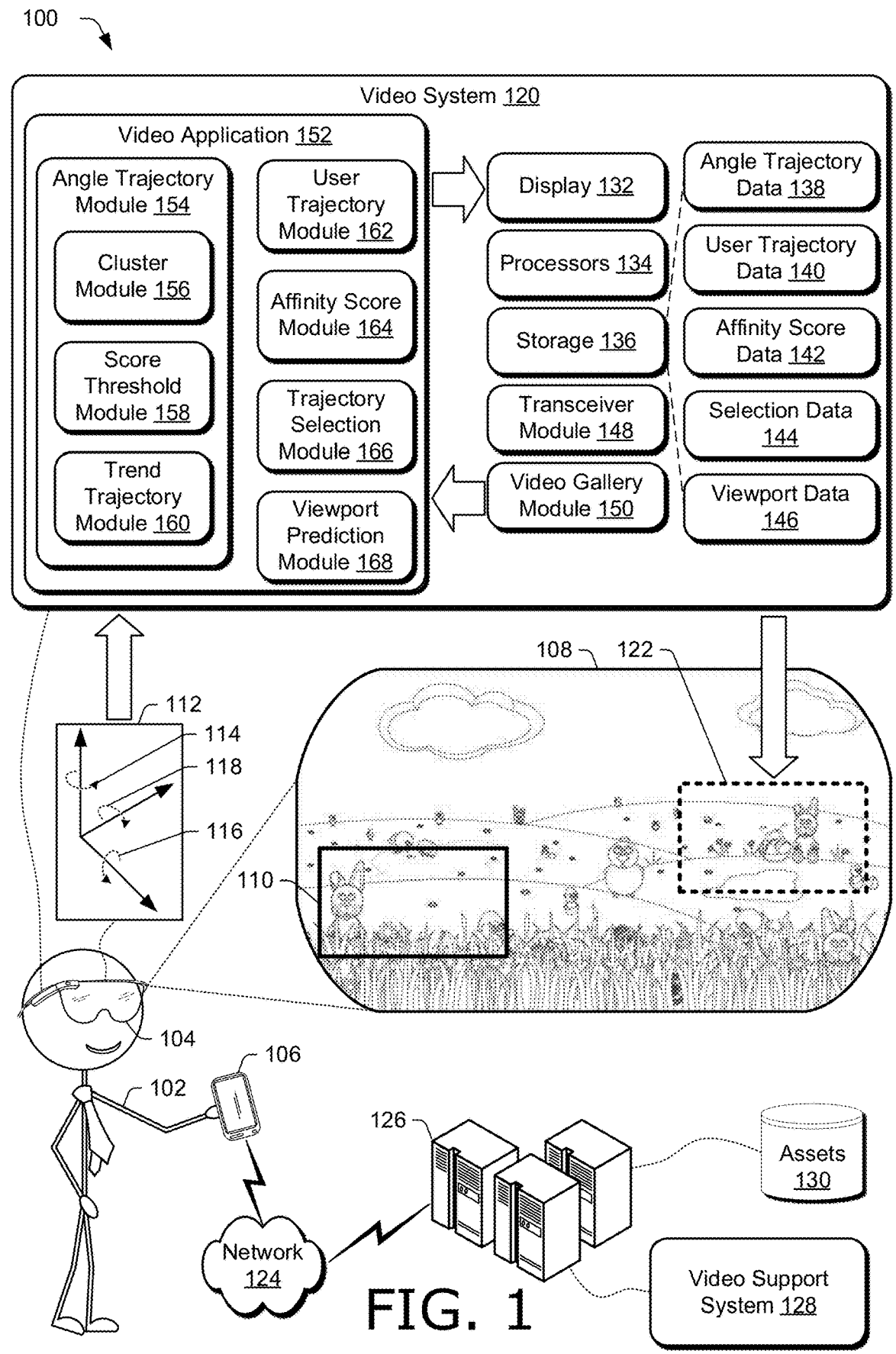
FIG. 1 illustrates a digital medium environment in an example implementation that is operable to employ techniques described herein.

A 360-degree video (e.g., an immersive video or spherical video) includes multiple viewing directions for the 360-degree video, and can be used in virtual reality, gaming, and any playback situation where a viewer can control his or her viewing direction and viewport, which is the part of the 360-degree video viewed by a user at a given time. For instance, when viewing a 360-degree video that allows a user to immerse themselves in the 360-degree video using virtual reality, such as in a virtual reality environment of a video game, the viewport corresponding to the user changes over time as the user moves within the virtual reality environment and views different portions of the 360-degree video. Consequently, conventional systems may perform viewport-based adaptive streaming in which a future viewport for a user is predicted, and this future viewport and a current viewport for the user are delivered (e.g., to a client device over a network) at a higher quality than other portions of the 360-degree video that are delivered in a lower quality format to reduce bandwidth requirements.

However, these conventional systems predict future viewports over short-term time horizons, e.g., less than two seconds—far less than the delays of video buffers typically found on devices that process and display videos, e.g., 10-15 seconds for most client devices. Unfortunately, these conventional systems do not scale to long-term horizons corresponding to the delays of video buffers. For instance, these conventional systems may rely on physical movements of a user without considering how other users viewed the content of the 360-degree video, and often use second-order statistics which simply do not include the information needed for long-term time horizons. When a video buffer with a long-term time horizon is used, these conventional systems suffer from quality degradation as the user moves due to the poor performance of short-term based prediction algorithms. When a video buffer with a short-term time horizon is used, delivery of the 360-degree video is susceptible to bandwidth fluctuations that cause video freezes and quality degradations, even if the short-term based prediction algorithms are effective at predicting a user viewport for the short-term time horizon. Hence, conventional systems that perform viewport-based adaptive streaming are inefficient and result in poor viewing experiences for the user.

Accordingly, this disclosure describes systems, devices, and techniques for trajectory-based viewport prediction for 360-degree videos. A video system predicts a user viewport for a 360-degree video at a future time based on trajectories of angles that determine viewports for the 360-degree video at earlier times than the future time. Angles may include a yaw angle, a pitch angle, and a roll angle for a user, such as based on a user's head, eyes, virtual reality device (e.g., head-mounted virtual-reality goggles), and the like, that are used to determine a viewport for the user.

The video system obtains trajectories of angles, such as a trajectory of yaw angles, a trajectory of pitch angles, a trajectory of roll angles, a trajectory that jointly represents two or more angles, or combinations thereof, for a plurality of users for a 360-degree video. The angles are sampled at time instances of the 360-degree video and correspond to viewports of the 360-degree video at the time instances for a plurality of viewers of the 360-degree video, such as users who have previously viewed the 360-degree video. The video system exploits the observation that many users consume a given 360-degree video in similar ways. Hence, the video system clusters the angle trajectories into trajectory clusters, and determines trend trajectories (e.g., average trajectories) and score thresholds for each trajectory cluster. When a new user views the 360-degree video for a time period, the video system can match the new user's angles collected over the time period of the 360-degree video to one or more trajectory clusters based on the trend trajectories and score thresholds, and predict a viewport for the new user at a future time relative to the time period from the trajectory clusters that match the new user's angles.

The video system can cluster the trajectories of angles into trajectory clusters in any suitable way, including trajectory clusters for yaw angle, trajectory clusters for pitch angle, trajectory clusters for roll angle, and trajectory clusters for a joint angle that jointly represents two or more angles. Hence, the video system can process yaw, pitch, and roll angles independently and cluster the trajectories of angles into trajectory clusters separately for the yaw, pitch, and roll angles. Additionally or alternatively, the video system can process yaw, pitch, and roll angles jointly by processing a joint angle that represents two or more of the yaw, pitch, and roll angles, and cluster trajectories of joint angles into trajectory clusters. Trajectory clusters include trajectories of angles deemed by the video system to be similar. For instance, pairs of trajectories belonging to a trajectory cluster may have affinity scores above a threshold affinity score, and the affinity score for a pair of trajectories may be determined from a mutual distance between the pair of trajectories.

The video system determines a score threshold for each trajectory cluster identified by the video system. In one example, the video system determines a score threshold for a trajectory cluster based on the mutual distances of pairs of trajectories that belong to the trajectory cluster. For instance, the video system may determine a maximum mutual distance for pairs of trajectories that belong to the trajectory cluster (e.g., the mutual distance for the pair of trajectories that are farthest from each other among the pairs of trajectories belonging to the trajectory cluster). The video system may determine the score threshold for the trajectory cluster from an affinity score based on the maximum mutual distance for the trajectory cluster. The video system uses the score thresholds for the trajectory clusters to determine if a trajectory of a new user's angles belongs to a trajectory cluster. For instance, the video system may require that a user trajectory (e.g., a trajectory of user angles) and the trend trajectory for the trajectory cluster have an affinity score determined from the mutual distance between the user trajectory and the trend trajectory that is greater than the score threshold for the trajectory cluster.

The video system can determine a trend trajectory that represents the trajectories of a trajectory cluster in any suitable way. In one example, the video system breaks the 360-degree video into time intervals (e.g., equally-spaced time intervals), and determines, for each time interval, polynomial coefficients of a polynomial function that is fitted to the trajectories of the trajectory cluster over the time interval. The video system forms a union over the time intervals of the polynomial functions having the polynomial coefficients to determine the trend trajectory for each trajectory cluster. Hence, a trend trajectory can be represented as a piecewise polynomial. The video system can fit polynomial coefficients of a polynomial function to the trajectories of the trajectory cluster in any suitable way, such as by selecting the polynomial coefficients to minimize a difference function between the polynomial and a trajectory of angles over all trajectories of the trajectory cluster. In one example, the difference function includes a mean squared error between the polynomial and a trajectory of angles over all trajectories of the trajectory cluster. Additionally or alternatively, the difference function may be minimized subject to a boundary constraint on the polynomial functions at boundaries of the time intervals, to guarantee continuity across the time intervals for the trend trajectory.

The video system uses the trend trajectories and score thresholds for the trajectory clusters to predict a viewport for a user from user trajectories of angles for the user collected over a time period of the 360-degree video. The user trajectories can include yaw angles, pitch angles, roll angles, or combinations thereof, and determine user viewports of the 360-degree video during the time period. To predict a viewport for the user at a later time (e.g., a future time) relative to the time period, the video system determines affinity scores between the trend trajectories of the trajectory clusters and the user trajectories over the time period, and selects at least one trend trajectory based on comparing the affinity scores to the score thresholds. For instance, if the affinity score for a trend trajectory of a trajectory cluster and a user trajectory is greater than the score threshold for the trajectory cluster, then the video system may determine that the user trajectory belongs to the trajectory cluster. In one example, the video system selects a first trend trajectory for a yaw angle, a second trend trajectory for a pitch angle, and a third trend trajectory for a roll angle based on comparing the affinity scores for the trend trajectories and user trajectories to the score thresholds of the trajectory clusters. The video system predicts a user viewport of the 360-degree video for a later time than the time period based on the first trend trajectory, the second trend trajectory, and the third trend trajectory, such as by evaluating the polynomial functions for the first, second, and third trend trajectories at the later time to determine the user viewport for the later time.

In one example, the video system predicts a user viewport for a viewing (e.g., display or playback) of a 360-degree video from trend trajectories and score thresholds for trajectory clusters that correspond to different viewings of the 360-degree video than the viewing of the 360-degree video. For instance, the video system may be partially implemented by a server that clusters trajectories of angles for users who have previously viewed the 360-degree video (e.g., a history of viewings of the 360-degree video). At a later time when a new user views the 360-degree video on a client device, the server may deliver to the client device the trend trajectories and score thresholds for the trajectory clusters based on data from the history of viewings of the 360-degree video.

Additionally or alternatively, the video system can predict a user viewport for a display of a 360-degree video from trend trajectories and score thresholds for trajectory clusters that correspond to a same display (e.g., viewing or exposing) of the 360-degree video for which the user viewport is predicted. For instance, when a new user views the 360-degree video on a client device, such as during a live event with multiple simultaneous viewers of the live event, or as part of an interactive and immersive video game with multiple simultaneous users playing the video game, the video system implemented on the client device may obtain trajectories of angles for users who are currently watching the live event or playing the video game with the new user. The video system may cluster the trajectories of angles for the users who are currently watching the live event or playing the video game and determine trend trajectories and score thresholds for the trajectory clusters. Since users may consume portions of the live event or the video game in different orders and prior to the new user, the video system may predict a viewport for the new user from the trend trajectories and score thresholds for the trajectory clusters that include trajectories for the users who are currently viewing the live event or playing the video game with the new user. Hence, the video system may predict or update a prediction of a viewport of a 360-degree video for a user based on most-recently available angle trajectories, including angle trajectories for users who are consuming the 360-degree video simultaneously with the user, such as watching a live event or playing a video game concurrently with the user.

Accordingly, the video system predicts a user's viewport of a 360-degree video based on patterns of past viewing behavior of the 360-degree video, e.g., how other users viewed the 360-degree video, rather than relying on methods that do not adequately capture the information needed to predict viewports for long-term time horizons, such as second-order statistics or physical models of a user's movement without regard to how other users viewed the content of the 360-degree video. Hence, the video system can accurately predict a user's viewport for long-term time horizons (e.g., 10-15 seconds in the future) that correspond to a device's video buffer delay, so that the 360-degree video can be efficiently delivered and viewed without undesirable transitions in quality as the user changes the viewport of the 360-degree video.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having computing device 104 and computing device 106. Computing device 104 is depicted as a pair of goggles (e.g., virtual reality goggles), and computing device 106 is depicted as a smart phone. Computing devices 104 and 106 can include any suitable type of computing device, such as a mobile phone, tablet, laptop computer, desktop computer, gaming device, goggles, glasses, camera, digital assistant, echo device, image editor, non-linear editor, digital audio workstation, copier, scanner, client computing device, and the like. Hence, computing devices 104 and 106 may range from full resource devices with substantial memory and processor resources (e.g., personal computers, game consoles) to a low-resource device with limited memory or processing resources (e.g., mobile devices).

Computing devices 104 and 106 are illustrated as separate computing devices in FIG. 1 for clarity. In one example, computing devices 104 and 106 are included in a same computing device. Notably, computing devices 104 and 106 can include any suitable number of computing devices, such as one or more computing devices, (e.g., a smart phone connected to a tablet). Furthermore, discussion of one computing device of one of computing devices 104 and 106 is not limited to that one computing device, but generally applies to each of the computing devices 104 and 106.

Figure 7:
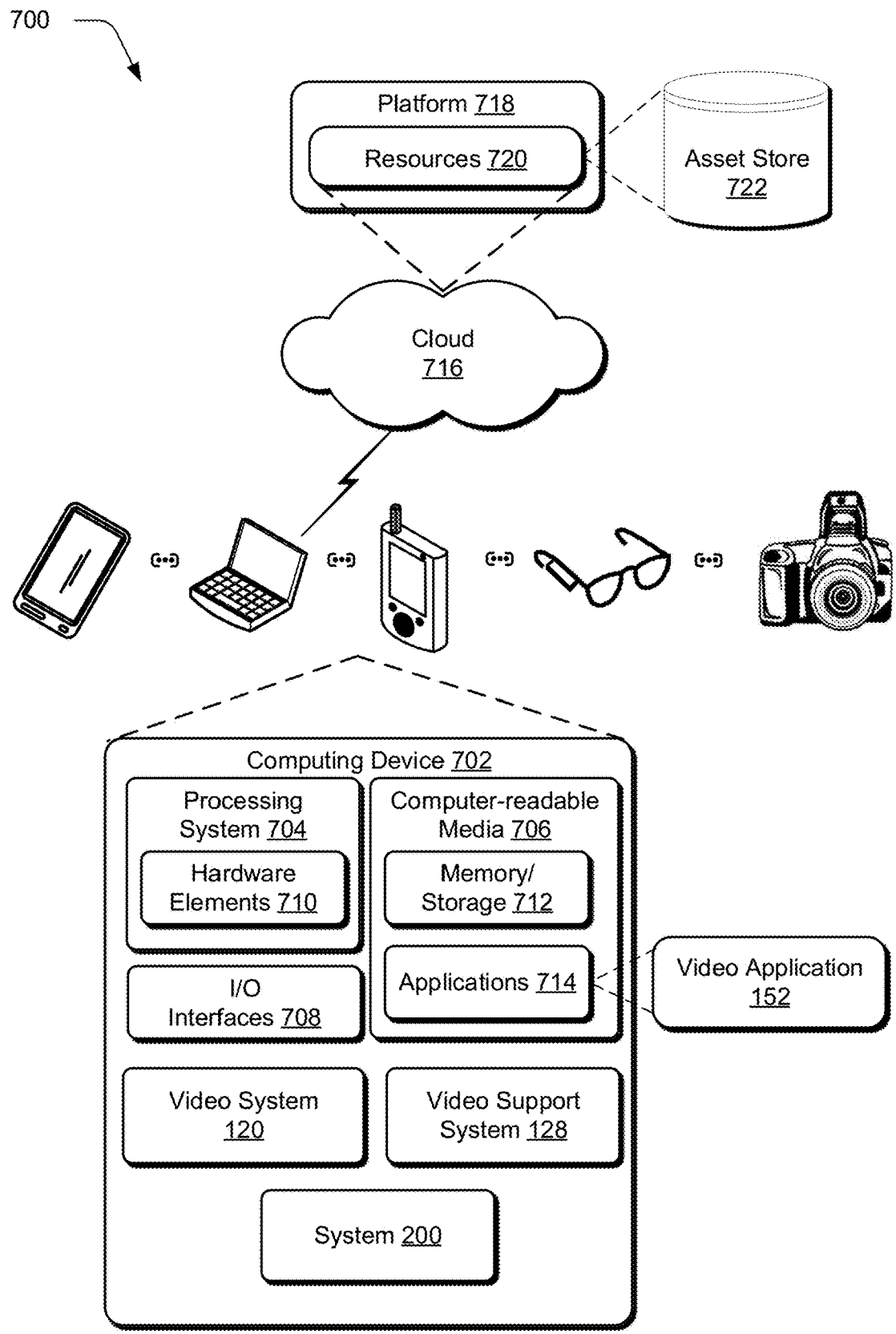
FIG. 7 illustrates an example system including various components of an example device that can be implemented as any type of computing device as described and/or utilized with reference to FIGS. 1-6 to implement aspects of the techniques described herein.

In one example, computing devices 104 and 106 are representative of one or a plurality of different devices connected to a network that perform operations "over the cloud" as further described in relation to FIG. 7. Additionally or alternatively, computing device 104 can be communicatively coupled to computing device 106, such as with a low power wireless communication standard (e.g., a Bluetooth® protocol). Hence, an asset (e.g., digital image, video, text, drawing, artwork, document, file, and the like) generated, processed, edited, or stored on one device (e.g., a tablet of computing device 106) can be communicated to, and displayed on and processed by another device (e.g., virtual reality goggles of computing device 104).

Various types of input devices and input instrumentalities can be used to provide input to computing devices 104 and 106. For example, computing devices 104 and 106 can recognize input as being a mouse input, stylus input, touch input, input provided through a natural user interface, and the like. In one example, computing devices 104 and 106 may display a 360-degree video, such as in a virtual reality environment, and include inputs to interact with the virtual reality environment, such as to facilitate a user moving within the virtual reality environment to change the viewport of the 360-degree video (e.g., the user's viewing perspective of the 360-degree video).

In this example of FIG. 1, computing device 104 displays a 360-degree video 108, which includes viewport 110 that corresponds to a current viewport of the 360-degree video 108 for the user 102 (e.g., the portion of the 360-degree video 108 that is currently being viewed by the user 102). The 360-degree video 108 may be any suitable size in any suitable dimension. In one example, the 360-degree video 108 spans 360 degrees along at least one axis, such as a horizontal axis. Additionally or alternatively, the 360-degree video 108 may span 360 degrees in multiple axes, such as including a spherical display format in which a user can change his or her viewport 360 degrees in any direction. In one example, the 360-degree video 108 spans less than 360 degrees in at least one axis. For instance, the 360-degree video 108 may include a panoramic video spanning 180 degrees, in which only a portion of the 180 degree span is viewable at any one time.

While the user 102 views the 360-degree video 108, computing device 104 determines angles 112 for the user 102 that are used to determine a viewport of the 360-degree video 108, such as viewport 110. For instance, computing device 104 may include a gyroscope that measures a yaw angle 114, a pitch angle 116, and a roll angle 118 in any suitable coordinate system, such as a coordinate system for the user's head, a coordinate system for the user's eyes, a coordinate system for goggles or a head-mounted display of the computing device 104, and the like. The yaw angle 114, the pitch angle 116, and the roll angle 118 are used to determine a viewport of the 360-degree video 108 because they correspond to a viewing direction of the 360-degree video 108 for the user 102. Computing device 104 determines values of the yaw angle 114, the pitch angle 116, and the roll angle 118 over time for the user 102, and can store these values as trajectories for the angles, such as a first trajectory including values of the yaw angle 114, a second trajectory including values of the pitch angle 116, and a third trajectory including values of the roll angle 118. The values of the angles may be sampled at time instances of the 360-degree video 108 (e.g., based on a timeline of the 360-degree video 108). Accordingly, the trajectories of the angles 112 represent a trajectory of the viewport 110 for the user 102 as the user changes his or her viewing direction of the 360-degree video 108, such as when the user 102 is immersed in a virtual reality environment represented by the 360-degree video 108 and moves within the environment.

Computing device 104 includes video system 120 that predicts a future viewport of the 360-degree video 108 for user 102 based on the trajectories of the angles 112. For instance, the video system 120 obtains trend trajectories and score thresholds for trajectory clusters, such as clusters of angle trajectories for users who have previously viewed the 360-degree video 108. The video system 120 compares the trajectories of the angles 112 for the user 102 to the trend trajectories, and based on the comparisons and the score thresholds, selects a first trend trajectory for the yaw angle 114, a second trend trajectory for the pitch angle 116, and a third trend trajectory for the roll angle 118 to represent the movement of the user 102 while viewing the 360-degree video 108.

The video system 120 evaluates the selected first, second, and third trend trajectories at a future time (e.g., a later time than the time period of the trajectories of the angles 112 for the user 102) to predict future viewport 122 of the 360-degree video 108 for the user 102. Because the video system 120 selects the first, second, and third trend trajectories based on users' movements while viewing the 360-degree video 108 itself, and since most users tend to consume 360-degree videos in similar ways, the video system 120 is able to accurately predict the future viewport 122 for the user 102 for long-term time horizons that correspond to typical delays of video buffers, such as 10-15 seconds, which is a significant improvement over conventional systems that are typically limited to viewport prediction for short-term time horizons (e.g., less than two seconds). Accordingly, the video system 120 can deliver the 360-degree video 108 to the user 102 efficiently and without undesirable transitions in the quality of the 360-degree video 108 as the user 102 changes the viewport, such as from viewport 110 to future viewport 122.

Computing device 106 is also coupled to network 124, which communicatively couples computing device 106 with server 126. Network 124 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof. For clarity, FIG. 1 does not depict computing device 104 as being coupled to network 124, though computing device 104 may also be coupled to network 124 and server 126.

Server 126 may include one or more servers or service providers that provide services, resources, assets, or combinations thereof to computing devices 104 and 106, such as 360-degree videos. Services, resources, or assets may be made available to video system 120, video support system 128, or combinations thereof, and stored at assets 130 of server 126. Hence, 360-degree video 108 can include any suitable 360-degree video stored at assets 130 of server 126 and delivered to a client device, such as the computing devices 104 and 106.

Server 126 includes video support system 128 configurable to receive signals from one or both of computing devices 104 and 106, process the received signals, and send the processed signals to one or both of computing devices 104 and 106 to support trajectory-based viewport prediction for 360-degree videos. For instance, computing device 106 may obtain user angle trajectories (e.g., a yaw angle trajectory, a pitch angle trajectory, and a roll angle trajectory) for user 102, and communicate them to server 126. Server 126, using video support system 128, may select trend trajectories for yaw angle, pitch angle, and roll angle based on comparing the user angle trajectories received from computing device 106 to trend trajectories for trajectory clusters corresponding to previous viewings of the 360-degree video 108. Server 126 may then send the selected trend trajectories for yaw angle, pitch angle, and roll angle back to computing device 106, which can predict a future viewport for the user 102 corresponding to a later time with the video system 120. Accordingly, the video support system 128 of server 126 can include a copy of the video system 120. In one example, computing device 106 sends a request for content of the 360-degree video 108 corresponding to the future viewport to server 126, which in response delivers the content of the 360-degree video 108 corresponding to the future viewport to computing device 106 at a higher quality (e.g., encoded at a higher bit rate) than other portions of the 360-degree video 108, to support viewport-based adaptive streaming.

Computing device 104 includes video system 120 for trajectory-based viewport prediction for 360-degree videos. The video system 120 includes a display 132, which can be used to display any suitable data used by or associated with video system 120. In one example, display 132 displays a viewport of a 360-degree video, such as viewport 110 of the 360-degree video 108. Portions of the 360-degree video 108 outside the current viewport may not be displayed in the display 132. As the current viewport of the 360-degree video 108 is changed over time in response to a user changing his or her viewing direction of the 360-degree video 108, the display 132 may change the portion of the 360-degree video 108 that is displayed. For instance, at a first time, the display 132 may display content of the 360-degree video 108 corresponding to viewport 110, and at a future time (e.g., ten seconds following the first time), the display 132 may display content of the 360-degree video 108 corresponding to viewport 122.

The video system 120 also includes processors 134. Processors 134 can include any suitable type of processor, such as a graphics processing unit, central processing unit, digital signal processor, processor core, combinations thereof, and the like. Hence, the video system 120 may be implemented at least partially by executing instructions stored in storage 136 on processors 134. For instance, processors 134 may execute portions of video application 152 (discussed below in more detail).

The video system 120 also includes storage 136, which can be any suitable type of storage accessible by or contained in the video system 120. Storage 136 stores data and provides access to and from memory included in storage 136 for any suitable type of data. For instance, storage 136 includes angle trajectory data 138 including data associated with trajectories of angles for viewers of a 360-degree video, such as representations of trajectory clusters (e.g., identification numbers of trajectory clusters, indications of types of angles of clusters, such as yaw, pitch, roll, or joint angles), angle trajectories belonging to trajectory clusters, identifiers of users corresponding to the angle trajectories, a date of a viewing of a 360-degree video used to determine angle trajectories, mutual distances for pairs of angle trajectories belonging to trajectory clusters, and affinity scores for pairs of angle trajectories belonging to trajectory clusters. Angle trajectory data 138 may also include trend trajectories for trajectory clusters (e.g., polynomial coefficients for piecewise polynomials making up a trend trajectory), a distance measure used to determine trend trajectories (e.g., minimum mean-squared error, absolute value, an indication of a boundary constraint, etc.), and a number of angle trajectories used to determine trend trajectories (e.g., a number of angle trajectories of a trajectory cluster used to determine polynomial coefficients of a trend trajectory for the trajectory cluster). Angle trajectory data 138 may also include score thresholds for trajectory clusters, a mutual distance used to determine a score threshold (e.g., a maximum mutual distance for pairs of angle trajectories belonging to a trajectory cluster), indications of a pair of angle trajectories used to determine a score threshold, statistics of score thresholds across trajectory clusters, such as mean, median, mode, variance, etc., combinations thereof, and the like.

Storage 136 also includes user trajectory data 140 including data related to a user viewing a 360-degree video, such as angle trajectories that determine user viewports of the 360-degree video, including a yaw angle trajectory, a pitch angle trajectory, a roll angle trajectory, and combinations thereof. User trajectory data 140 may also include an indication of a location of a device (e.g., a gyroscope) that measures the angle trajectories, such as a head of a user, an eye of a user, a pair of goggles, etc., and indicators of the 360-degree video corresponding to the angle trajectories, such as timestamps indicating time instances of the 360-degree video, scene identifiers, chapter identifiers, viewports of the 360-degree video, combinations thereof, and the like.

Storage 136 also includes affinity score data 142 including data related to affinity scores for trajectory clusters, such as mutual distances between user trajectories (e.g., trajectories of user angles) and trend trajectories, and affinity scores determined from the mutual distances. Affinity score data 142 may also include a time period of the 360-degree video corresponding to the user trajectories (e.g., time instances for which the angles of the user trajectories are sampled), and the like.

Storage 136 also includes selection data 144 including data related to determining trend trajectories that match user trajectories, such as affinity scores between user trajectories (e.g., trajectories of user angles) and trend trajectories, differences between the affinity scores and score thresholds for the trajectory clusters, and selected trend trajectories (e.g., a first trajectory including values of a yaw angle, a second trajectory including values of a pitch angle, and a third trajectory including values of roll angle) to assign to a user and predict a future viewport for the user. Selection data 144 may also include indications of whether or not the selected trend trajectories comply with a selection constraint, such as requiring the affinity score between a user trajectory and the trend trajectory to be greater than the score threshold for the trajectory cluster represented by the trend trajectory. For instance, when no trend trajectory satisfies the selection constraint, the video system 120 may select a trend trajectory that is closest to a user trajectory based on the affinity score for the trend trajectory and the user trajectory, despite the affinity score being less than the score threshold for the trend trajectory (e.g., for the trajectory cluster represented by the trend trajectory).

Storage 136 also includes viewport data 146 including data related to viewports of a 360-degree video, such as a predicted viewport (e.g., a viewport for a user predicted by the video system 120) and indications of the trend trajectories used to predict the viewport. Viewport data 146 may also include data related to a time for which the video system 120 predicts the viewport, such as a time horizon (e.g., 10 seconds) from a current time, a percentage of storage of a video buffer corresponding to the time horizon, combinations thereof, and the like. In one example, viewport data 146 includes data related to a viewport, such as content of the 360-degree video for the viewport, an indicator of quality for content of a viewport, such as encoder rate, and the like.

Furthermore, the video system 120 includes transceiver module 148. Transceiver module 148 is representative of functionality configured to transmit and receive data using any suitable type and number of communication protocols. For instance, data within video system 120 may be transmitted to server 126 with transceiver module 148. Furthermore, data can be received from server 126 with transceiver module 148. Transceiver module 148 can also transmit and receive data between computing devices, such as between computing device 104 and computing device 106. In one example, transceiver module 148 includes a low power wireless communication standard (e.g., a Bluetooth® protocol) for communicating data between computing devices.

The video system 120 also includes video gallery module 150, which is representative of functionality configured to obtain and manage videos, including 360-degree videos. Hence, video gallery module 150 may use transceiver module 148 to obtain any suitable data for a 360-degree video from any suitable source, including obtaining 360-degree videos from a server, such as server 126, computing device 106, or combinations thereof. Data regarding 360-degree videos obtained by video gallery module 150, such as content of 360-degree videos, viewports of 360-degree videos, encoder rates for content of 360-degree videos, and the like can be stored in storage 136 and made available to modules of the video system 120.

The video system 120 also includes video application 152. The video application 152 includes angle trajectory module 154, which includes cluster module 156, score threshold module 158, and trend trajectory module 160. The video application 152 also includes user trajectory module 162, affinity score module 164, trajectory selection module 166, and viewport prediction module 168. These modules work in conjunction with each other to facilitate trajectory-based viewport prediction for 360-degree videos.

Angle trajectory module 154 is representative of functionality configured to determine score thresholds and trend trajectories for trajectory clusters. For instance, cluster module 156 clusters angle trajectories into trajectory clusters, score threshold module 158 determines score thresholds for the trajectory clusters, and trend trajectory module 160 determines trend trajectories for the trajectory clusters that represent the trajectories belonging to the trajectory clusters. Angle trajectory module 154 can determine score thresholds and trend trajectories for trajectory clusters on any suitable device. In one example, angle trajectory module 154 is implemented by a server, such as server 126, and the server provides the score thresholds and trend trajectories for trajectory clusters to a client device (e.g., computing device 104 or computing device 106). Additionally or alternatively, the angle trajectory module 154 can be implemented by a client device, such as computing device 104 or computing device 106.

Angle trajectory module 154 can determine score thresholds and trend trajectories for trajectory clusters at any suitable time to be used by the video system 120. For instance, a server may provide the score thresholds and trend trajectories for trajectory clusters to computing device 106 periodically (e.g., updated every 24 hours or weekly), in response to the user 102 enabling the 360-degree video 108 (e.g., when the user 102 begins viewing the 360-degree video 108), during a viewing of the 360-degree video 108 (e.g., after the user 102 has begun consuming the 360-degree video 108), combinations thereof, and the like. Additionally or alternatively, a client device may generate the score thresholds and trend trajectories for trajectory clusters periodically, or in response to the user 102 enabling the 360-degree video 108.

In one example, angle trajectory module 154 generates the score thresholds and trend trajectories for trajectory clusters during a display of the 360-degree video 108 (e.g., after the user 102 has begun consuming the 360-degree video 108). In this case, the score thresholds and the trend trajectories may be based on angle trajectories of users who are consuming the 360-degree video 108 at the same time as the user 102 (e.g., a same viewing of the 360-degree video 108, such as in a multi-player video game). For instance, the 360-degree video 108 may be broken into chapters, and the chapters may be consumed by users in an interactive fashion based on user selections, such as a user's location within a virtual reality environment of a video game. Hence, the chapters may be consumed in different orders by different users of the 360-degree video 108. Accordingly, some users may view some chapters of the 360-degree video 108 prior to the user 102, but still during a same playing of the 360-degree video 108, so that the user movements and angle trajectories may be used by the video system 120 to determine score thresholds and trend trajectories to predict a viewport for the user 102 based on the chapter of the 360-degree video 108 being consumed by the user 102.

Cluster module 156 is representative of functionality configured to cluster trajectories of angles into trajectory clusters. In one example, cluster module 156 clusters trajectories separately for different types of angles, such as by clustering trajectories of yaw angles into trajectory clusters for yaw angles, clustering trajectories of pitch angles into trajectory clusters for pitch angles, and clustering trajectories of roll angles into trajectory clusters for roll angles.

Cluster module 156 can cluster trajectories of angles into trajectory clusters in any suitable way. In one example, cluster module 156 determines mutual distances between pairs of angle trajectories, affinity scores from the mutual distances, and angle trajectories belonging to the trajectory clusters from the affinity scores. Cluster module 156 can use any suitable distance measure to determine mutual distances between pairs of angle trajectories. Let $P=[p_1\ p_2\ p_3\ \ldots]$ and $Q=[q_1\ q_2\ q_3\ \ldots]$ represent two trajectories of a type of angle (e.g., a yaw angle), so that $p_i$ and $q_i$ each denote a yaw angle for a different user, and the subscript i denotes a sample value (e.g., a time instance of a 360-degree video). In one example, cluster module 156 determines a mutual distance $D(P,Q)$ between the pair of trajectories P and Q according to $$D(P, Q) = \operatorname*{ord}_{p \in P}^{\alpha} \widetilde{d(p, Q)}$$

$$\widetilde{d(p, Q)} = \min_{q \in N(C(p,Q),Q)} d(p, q)$$

where $C(p,Q)$ maps a point $p \in P$ to a corresponding point of Q at a same relative position (e.g., sample value or time instance of the 360-degree video), $N(q,Q)$ maps the point $q \in Q$ to the set of neighboring points of Q in the time interval $[t_q-T_l;\ t_q+T_l]$ for time instance $t_q$ of the point q and tunable parameter $T_l$ (e.g., two seconds), and $d(p,q)$ denotes the distance between the points p and q (e.g., the absolute value of the difference between the angles represented by p and q). Cluster module 156 determines the quantity $\widetilde{d(p, Q)}$ for each point in P, and the mutual distance $D(P,Q)$ is determined from the value of $\widetilde{d(p, Q)}$ larger than a percentage $\alpha$ of all values of $\widetilde{d(p, Q)}$. For instance, for the example where $\widetilde{d(p, Q)} = [0.1\ 0.2\ 0.3\ 0.4\ 0.5\ 0.6\ 0.7\ 0.8\ 0.9\ 1.0]$ and $\alpha=80\%$, the mutual distance is 0.8. By conditioning the mutual distance based on the percentage $\alpha$, cluster module 156 discards outlier values of $\widetilde{d(p, Q)}$. In one example, the percentage $\alpha$ is set to 95%. Generally, the mutual distance is not symmetric, so that $D(P,Q) \neq D(Q,P)$. Hence, a mutual distance between the pair of trajectories P and Q can include both measures $D(P,Q)$ and $D(Q,P)$.

Cluster module 156 determines the mutual distance, including both $D(P,Q)$ and $D(Q,P)$, between the pair of trajectories P and Q for all trajectories to be clustered together (e.g., for trajectories of yaw angles separately from trajectories of pitch angles and separately from trajectories of roll angles). Based on the mutual distances between pairs of trajectories P and Q, the cluster module 156 determines an affinity score $K(P,Q)$ between the pair of trajectories P and Q for all trajectories to be clustered together. In one example, the cluster module 156 determines an affinity score $K(P,Q)$ according to $$K(P, Q) = e^{-\frac{D(P,Q)D(Q,P)}{2\sigma^2}} \forall P, \forall Q$$

where $\sigma$ is a tunable scaling parameter that scales the affinity score. In one example, $\sigma$ is set to a value of ten.

The cluster module 156 includes a spectral clustering algorithm, such as a spectral clustering algorithm as described for vehicle trajectories in "Clustering of Vehicle Trajectories" in *IEEE Transactions on Intelligent Systems*, 11(3):647-657, September 2010, the disclosure of which is incorporated herein by reference in its entirety. The cluster module 156 provides the affinity scores $K(P,Q)$ for all P and Q as inputs to the spectral clustering algorithm, and the spectral clustering algorithm clusters trajectories that are similar based on the affinity scores into trajectory clusters. For instance, all pairs of a trajectory cluster identified by cluster module 156 may have an affinity score greater than a threshold affinity score.

Trajectory clusters determined by cluster module 156, along with any suitable information, such as mutual distances, affinity scores, numbers of trajectory clusters, numbers of angle trajectories belonging to trajectory clusters, identifiers of trajectories (e.g., trajectory identification numbers), identifiers of trajectory clusters that each trajectory belongs (e.g., cluster identification numbers), parameters used to cluster angle trajectories into trajectory clusters, such as percentage a, tunable parameter $T_l$, and scaling parameter $\sigma$, combinations thereof, and the like, used by or calculated by cluster module 156 are stored in angle trajectory data 138 of storage 136 and made available to modules of video application 152. In one example, trajectory clusters determined by cluster module 156 are provided to trend trajectory module 160. Additionally or alternatively, cluster module 156 provides mutual distances of pairs of trajectories in trajectory clusters to score threshold module 158.

Score threshold module 158 is representative of functionality configured to determine score thresholds for trajectory clusters, such as the trajectory clusters identified by cluster module 156. A score threshold determined by score threshold module 158 can be used by video system 120 to determine if a trajectory (e.g., a user trajectory obtained during a viewing of a 360-degree video) belongs to a trajectory cluster, such as by comparing a distance measure between the user trajectory and a trend trajectory for the trajectory cluster to the score threshold for the trajectory cluster.

Score threshold module 158 can determine score thresholds for trajectory clusters in any suitable way. In one example, score threshold module 158 determines a score threshold for each trajectory cluster from the minimum affinity score for pairs of trajectories belonging to the trajectory cluster. For instance, score threshold module 158 may set the score threshold for a trajectory cluster based on the minimum affinity score among pairs of trajectories belonging to the trajectory cluster, such as equal to the minimum affinity score, a scaled version of the minimum affinity score (e.g., 110% of the minimum affinity score), and the like. Hence, the score threshold can represent a minimum affinity score that a pair of trajectories must have to belong to the trajectory cluster.

Additionally or alternatively, since cluster module 156 determines an affinity score for a pair of trajectories based on the mutual distance between the pair of trajectories, score threshold module 158 can determine a score threshold for each trajectory cluster from mutual distances between pairs of trajectories belonging to a trajectory cluster. For instance, score threshold module 158 may determine a score threshold for a trajectory cluster from a maximum mutual distance among the mutual distances of pairs of trajectories belonging to the trajectory cluster (e.g., the maximum mutual distance corresponds to a pair of trajectories that are farthest apart from one another among the pairs of trajectories belonging to the trajectory cluster). Score threshold module 158 may determine a maximum mutual distance in any suitable way, such as according to $$\max_{P,Q}(D(P, Q) + D(Q, P))$$

for pairs of trajectories P, Q belonging to the trajectory cluster. In one example, score threshold module 158 sets the score threshold for a trajectory cluster equal to the maximum mutual distance among the mutual distances of pairs of trajectories belonging to the trajectory cluster. Additionally or alternatively, score threshold module 158 can set the score threshold for a trajectory cluster to a scaled version of the maximum mutual distance (e.g., 90% of the maximum mutual distance). Hence, the score threshold can represent a maximum mutual distance that a pair of trajectories can have to belong to the trajectory cluster.

Score thresholds determined by score threshold module 158, along with any suitable information, such as mutual distances, affinity scores, scale factors used to determine the score thresholds, statistics of the score thresholds across the trajectory clusters (e.g., mean, median, mode, standard deviation, etc.), combinations thereof, and the like, used by or calculated by score threshold module 158 are stored in angle trajectory data 138 of storage 136 and made available to modules of video application 152. In one example, score thresholds determined by score threshold module 158 are provided to trajectory selection module 166.

Trend trajectory module 160 is representative of functionality configured to determine trend trajectories for trajectory clusters, such as the trajectory clusters identified by cluster module 156. The trend trajectories determined by trend trajectory module 160 represent the trajectories belonging to the trajectory clusters. For instance, the trend trajectories can be an average trajectory for a trajectory cluster, one trajectory of a trajectory cluster, a combination of trajectories of a trajectory cluster, or any suitable trajectory that represents the trajectories of a trajectory cluster.

Trend trajectory module 160 can determine trend trajectories for trajectory clusters in any suitable way. In one example, trend trajectory module 160 selects one trajectory from among trajectories of a trajectory cluster and approximates the one trajectory by a function, such as a polynomial, a spline of polynomials, piecewise connected polynomials, a sum of basis functions, combinations thereof, and the like. For instance, trend trajectory module 160 may break up the one trajectory into segments and fit a function to the one trajectory over each segment. To fit a function to the one trajectory, trend trajectory module 160 may minimize a cost function (e.g., mean-squared error) over parameters of the function (e.g., polynomial coefficients) subject to a boundary constraint at the segment boundaries.

By selecting one of the trajectories of a trajectory cluster to determine a trend trajectory, rather than multiple trajectories, the processing requirements needed to determine trend trajectories may be reduced. This reduction in processing requirements can be an advantage in some situations, such as when trend trajectory module 160 is needed to determine the trend trajectories quickly (e.g., responsive to a user-request to display a 360-degree video so that perceptible delay to the user is minimized), or during a display of a 360-degree video (e.g., when a user is playing a video game with a 360-degree video environment, the user's viewport can be predicted based on updated trend trajectories that reflect a most recent set of data, including data for users of the video game who are concurrently playing the video game).

In one example, trend trajectory module 160 determines trend trajectories for trajectory clusters based on multiple trajectories in the trajectory clusters, such as all the trajectories belonging to a trajectory cluster. For instance, trend trajectory module 160 can divide a 360-degree video into intervals (e.g., equally-spaced time intervals for the 360-degree video, for chapters of the 360-degree video, for scenes of the 360-degree video, combinations thereof, and the like.). In one example, the intervals include equally-spaced time intervals of the 360-degree video (e.g., three second intervals). For each trajectory cluster determined by cluster module 156, trend trajectory module 160 can determine a function $r_i(t)$, where subscript i denotes a time interval of the 360-degree video. The trend trajectory $R^C$ for the trajectory cluster C is the union of the functions over the time intervals, or $R^C = \cup_i r_i(t)$. Trend trajectory module 160 can determine trend trajectories for trajectory clusters by fitting the function $r_i(t)$ to multiple trajectories of the trajectory clusters, such as in a least-squares sense.

Trend trajectory module 160 can use any suitable function $r_i(t)$ to construct the trend trajectories, such as polynomials, exponentials, trigonometric functions, wavelets, etc. In one example, trend trajectory module 160 represents each function $r_i(t)$ as an $N^{th}$ order polynomial, or $$r_i(t) = \sum_{j=0}^{N} \lambda_j t^j \; \forall \, t \in [T_i, T_{i+1}]$$

where $\lambda_j$ are polynomial coefficients. The order of the polynomial can be set to any suitable order. In one example, the order is set to seven (e.g., N=7).

To determine the polynomial coefficients so that the trend trajectories represent the trajectories of a trajectory cluster, trend trajectory module 160 can fit the functions $r_i(t)$ to the trajectories of the trajectory cluster. In one example, trend trajectory module 160 fits the functions $r_i(t)$ to the trajectories based on a distance measure between the trend trajectory and the trajectories in the cluster, such as a minimum mean-squared error distance measure. For instance, trend trajectory module 160 can determine the polynomial coefficients to minimize a mean-squared error cost function subject to a boundary constraint, or $$\min_{\lambda} \sum_{P \in C} \sum_{p \in P[T_i, T_{i+1}]} |p - r_i(t_p)|^2$$
$$\text{s.t. } r_i(T_i) = r_{i-1}(T_i)$$

where $t_p$ is the time instance of angle p, $P[T_i, T_{i+1}]$ indicates all points of P in the interval $[T_i, T_{i+1}]$, and $P \in C$ denotes multiple trajectories of the trajectory cluster C (e.g., all trajectories of the trajectory cluster C). The constraint $r_i(T_i) = r_{i-1}(T_i)$ enforces a boundary condition that guarantees continuity across time intervals for the trend trajectory $R^C$. Trend trajectory module 160 can determine polynomial coefficients for each time interval to determine a trend trajectory for each trajectory cluster identified by cluster module 156.

Trend trajectories determined by trend trajectory module 160, along with any suitable information, such as polynomial coefficients, an indication of a number of trajectories of a cluster used to determine the trend trajectory for the cluster (e.g., one, all, or some but not all of the trajectories), values of a cost function (e.g., a minimum mean-squared error used to determine polynomial coefficients), a time duration between samples of angles making up a trajectory of a trajectory cluster, combinations thereof, and the like, used by or calculated by trend trajectory module 160 are stored in angle trajectory data 138 of storage 136 and made available to modules of video application 152. In one example, trend trajectories determined by trend trajectory module 160 are provided to affinity score module 164 and trajectory selection module 166.

User trajectory module 162 is representative of functionality configured to obtain, during a display of a 360-degree video, user trajectories of user angles for a time period of the 360-degree video being displayed. The user angles correspond to user viewports of the 360-degree video during the time period of the 360-degree video being displayed. For instance, user trajectory module 162 may obtain user trajectories of user angles, including a trajectory of yaw angles, a trajectory of roll angles, and a trajectory of pitch angles collected for a time period while a user is viewing the 360-degree video. The angles 112 in FIG. 1 are examples of user angles in user trajectories obtained by user trajectory module 162. For any given time instance of the time period, the user angles can be used to determine a user viewport during the time period. For instance, for any given time instance of the time period, the user angles correspond to a content portion of the 360-degree video consumed by the user at the given time instance, such as a portion of content in viewport 110.

User trajectory module 162 can obtain the user trajectories in any suitable way. For instance, user trajectory module 162 may automatically record the user trajectories responsive to the 360-degree video 108 being displayed, such as when a user 102 enables a viewing device (e.g., virtual-reality goggles) to display the 360-degree video 108 and a viewport of the 360-degree video 108 is displayed, such as a first viewport of the 360-degree video 108 displayed to the user 102. Additionally or alternatively, user trajectory module 162 may record the user trajectories responsive to a user selection to enable recording, such as a "record user angles now" button on a display device, e.g., a head-mounted display. In one example, a user may select to disregard previously-recorded user trajectories, such as by selecting a "record over" button on a head-mounted display that erases previously-recorded user trajectories and begins recording new user trajectories when selected. Hence, the user may disregard old or unreliable user trajectories and facilitate the video system 120 to better predict a future viewport for the user based on more reliable user trajectories that more accurately reflect the user's movements and viewports, thus improving the delivery and playback of the 360-degree video 108 (e.g., by reducing the transitions in quality as the user moves and changes the viewport).

User trajectories of user angles obtained by user trajectory module 162 can include timestamps for each user angle, such as a time value indicating a time on a timeline of a 360-degree video, a sample number, a time value indicating a time on a time line of a chapter or scene of the 360-degree video, a chapter number, a scene number, combinations thereof, and the like. Hence, a timestamp for a user angle can associate the user angle with a specific time of a 360-degree video, specific content of a 360-degree video, a playback sequence of a 360-degree video, combinations thereof, and the like.

User trajectory module 162 can obtain user trajectories that include angles sampled at any suitable rate. In one example, the sampling rate of the user angles in the user trajectories is based on the 360-degree video being displayed. For instance, the sampling rate may be determined from a rate of the 360-degree video, such as derived from a frame rate of the 360-degree video, or set so that a prescribed number of samples of the user angles are recorded for a chapter or scene of the 360-degree video. In one example, the sampling rate of the user angles in the user trajectories is user-selectable. For instance, a user may select a rate adjuster control via video system 120, such as via a user interface exposed by display 132.

User trajectories determined by user trajectory module 162, along with any suitable information, such as a sampling rate of the user angles in the user trajectories, indicators of a type of user angle of the user trajectories (e.g., indicators of yaw angles, pitch angles, and roll angles), timestamps of user angles, combinations thereof, and the like, used by or calculated by user trajectory module 162 are stored in user trajectory data 140 of storage 136 and made available to modules of video application 152. In one example, user trajectories obtained by user trajectory module 162 are provided to affinity score module 164.

Affinity score module 164 is representative of functionality configured to determine affinity scores for trajectory clusters based on user trajectories and trend trajectories for the trajectory clusters. Affinity score module 164 can determine affinity scores based on the trend trajectories evaluated for times within the time period used to collect the user trajectories. For instance, for each trajectory cluster for a type of angle, such as a yaw angle, affinity score module 164 determines an affinity score for the trajectory cluster by computing the affinity score between the trend trajectory for the trajectory cluster and a user trajectory for the type of angle. Since the user angles of the user trajectory are collected over a time period, affinity score module 164 evaluates the trend trajectory over this time period to compute the affinity score.

Let user trajectory U represent a user trajectory of any type of user angles, such as a trajectory of yaw angles or a trajectory of pitch angles, collected over the time period $[0;T_n]$. For instance, the user trajectory may be recorded by user trajectory module 162 for the first $T_n$ seconds of a 360-degree video. In one example, the affinity score module 164 processes the user trajectories for the different types of angles separately, such as by first determining affinity scores for yaw angles, followed by determining affinity scores for pitch angles, followed by determining affinity scores for roll angles.

The affinity score module 164 determines an affinity score between the user trajectory U and each of the trend trajectories representing trajectory clusters for the type of angle (e.g., yaw angles). Hence, the affinity score module 164 determines an affinity score $K(U, R^C[0;T_n])$ based on the mutual distance between the user trajectory and the trend trajectory as described above. Here, $R^C[0;T_n]$ denotes the trend trajectory of trajectory cluster C evaluated for time instances within the time period $[0;T_n]$.

Accordingly, for user trajectories obtained by user trajectory module 162, affinity score module 164 can determine a respective affinity score for each trajectory cluster clustered by cluster module 156 based on the trend trajectories for the trajectory clusters and the type of angles included in the trend trajectories. The video system 120 uses the affinity scores to match the user trajectories to the trajectory clusters (e.g., to determine which trajectory cluster, if any, a user trajectory may belong to).

Affinity scores determined by affinity score module 164, along with any suitable information, such as mutual distances between user trajectories and trend trajectories, statistics of affinity scores across trajectory clusters, such as mean, median, mode, variance, maximum, minimum, etc., a time period of a 360-degree video for which an affinity score is determined (e.g., a time period of user angles included in a user trajectory), combinations thereof, and the like, used by or calculated by affinity score module 164 are stored in affinity score data 142 of storage 136 and made available to modules of video application 152. In one example, affinity scores determined by affinity score module 164 are provided to trajectory selection module 166.

Trajectory selection module 166 is representative of functionality configured to select trend trajectories based on the affinity scores determined by affinity score module 164 and the score thresholds determined by the score threshold module 158. Trajectory selection module 166 selects trend trajectories for trajectory clusters that match user trajectories. For instance, when trajectory selection module 166 selects a trend trajectory, the trajectory selection module 166 determines that a user trajectory belongs to the trajectory cluster represented by the trend trajectory.

In one example, trajectory selection module 166 selects a first trend trajectory for a yaw angle, a second trend trajectory for a pitch angle, and a third trend trajectory for a roll angle from the trend trajectories based on the affinity scores and the score thresholds. For instance, among the trend trajectories representing trajectory clusters for yaw angles, trajectory selection module 166 selects the trend trajectory with the highest affinity score as the first trend trajectory. Among the trend trajectories representing trajectory clusters for pitch angles, trajectory selection module 166 selects the trend trajectory with the highest affinity score as the second trend trajectory. Among the trend trajectories representing trajectory clusters for roll angles, trajectory selection module 166 selects the trend trajectory with the highest affinity score as the third trend trajectory.

Additionally or alternatively, trajectory selection module 166 can select a trend trajectory based on the score threshold of the trajectory cluster represented by the trend trajectory. For instance, trajectory selection module 166 may require that the affinity score between the trend trajectory and the user trajectory be greater than the score threshold of the trajectory cluster represented by the trend trajectory to select the trend trajectory. If this selection constraint based on the score threshold is not satisfied for one or more of the yaw, pitch, and roll angles, the trajectory selection module 166 may not select a trend trajectory representing the trajectory cluster for the one or more angles. For instance, the trajectory selection module 166 may not match the user trajectory to any trajectory cluster for an angle, such as a yaw angle. In this case, the trajectory selection module 166 may report that the user trajectory cannot be matched to an available trajectory cluster for the yaw angle. Additionally or alternatively, the trajectory selection module 166 may report that the user trajectory can be matched to an available trajectory cluster for pitch and roll angles, but not for the yaw angle. In one example, if the selection constraint cannot be satisfied for each of the yaw, pitch, and roll angles (e.g., the affinity scores are less than the score thresholds), then trajectory selection module 166 declares the user to be non-predictable and does not select any trend trajectory. For instance, the trajectory selection module 166 may cause a message of user non-predictability to be displayed on display 132, such as "unable to predict a viewport for this user". Additionally or alternatively, the trajectory selection module 166 may request that new user trajectories are obtained, such as corresponding to a different time period (e.g., a longer time period than that used for the user trajectories).

In one example, the trajectory selection module 166 may be configured to bypass the selection constraint based on the score threshold. For instance, rather than not select any trend trajectory for an angle type, such as yaw angle, trajectory selection module 166 may select a trend trajectory that is closest to a user trajectory based on the affinity score between the trend trajectory and the user trajectory for the angle, such as the trend trajectory having a highest affinity score with the user trajectory, despite the affinity score being less than the score threshold. Hence, the selection constraint based on the score threshold may be bypassed for some or all angles, such as one or more of yaw angle, pitch angle, or roll angle.

Trend trajectories determined by trajectory selection module 166, along with any suitable information, such as affinity scores, score thresholds, comparisons of affinity scores and score thresholds, indications of whether a selection constraint is satisfied for selected trend trajectories, combinations thereof, and the like, used by or calculated by trajectory selection module 166 are stored in selection data 144 of storage 136 and made available to modules of video application 152. In one example, trend trajectories selected by trajectory selection module 166 are provided to viewport prediction module 168.

Viewport prediction module 168 is representative of functionality configured to predict viewports based on the trend trajectories selected by trajectory selection module 166. Viewport prediction module 168 can predict a user viewport (e.g., a viewport for user 102) at a later time than the time period for which the user trajectories of user angles are obtained by user trajectory module 162 (e.g., a future time). In one example, viewport prediction module 168 predicts a user viewport of the 360-degree video for a later time than the time period based on a first trend trajectory for a yaw angle, a second trend trajectory for a pitch angle, and a third trend trajectory for a roll angle selected by trajectory selection module 166.

Viewport prediction module 168 can predict a user viewport based on trend trajectories in any suitable way. In one example, viewport prediction module 168 evaluates the trend trajectories at a later time to determine a predicted yaw angle, a predicted pitch angle, and a predicted roll angle that determine the predicted user viewport. For instance, let $R_\varphi^*$, $R_\omega^*$, and $R_\theta^*$ represent trend trajectories selected by trajectory selection module 166 for yaw angle $\varphi$, pitch angle $\omega$, and roll angle $\theta$, respectively, based on a user trajectory having user angles over the time period $[0;T_n]$. To predict yaw, pitch, and roll angles at a future time $T_n+T_h$, trajectory selection module 166 evaluates $R_\varphi^*$, $R_\omega^*$, and $R_\theta^*$ at future time $T_n+T_h$, or $$\varphi_{T_n+T_h} = R_{100}^*(T_n+T_h)$$

$$\omega_{T_n+T_h} = R_\omega^*(T_n+T_h)$$

$$\theta_{T_n+T_h} = R_\theta^*(T_n+T_h).$$

These predicted yaw, pitch, and roll angles at future time $T_n+T_h$ determine a viewing direction for the user at the future time, and hence can be used to determine a user viewport at the future time for the 360-degree video (e.g., a predicted user viewport). Viewport 122 is an example of a user viewport predicted by viewport prediction module 168 for the 360-degree video 108.

The time horizon $T_h$ can be a long-term time horizon, such as equal to a delay of a video buffer of computing device 104 or computing device 106 (e.g., 10-15 seconds). Accordingly, the time horizon $T_h$ is not limited to the short-term time horizons of conventional systems that are often less than two seconds, and typically just hundreds of milliseconds. Hence, the video system 120 can predict user viewports for long-term time horizons so that the 360-degree video can be efficiently delivered to a device and viewed without undesirable transitions in quality as the user changes the viewport of the 360-degree video.

User viewports predicted by viewport prediction module 168, along with any suitable information, such as a time horizon $T_h$, predicted yaw angles, predicted pitch angles, predicted roll angles, combinations thereof, and the like, used by or calculated by viewport prediction module 168 are stored in viewport data 146 of storage 136 and made available to modules of video application 152. In one example, a user viewport predicted by viewport prediction module 168 is communicated to a server (e.g., server 126) to request content of a 360-degree video corresponding to the user viewport at a higher quality than other portions of the 360-degree video in a viewport-based adaptive streaming delivery of the 360-degree video.

Example Video System

Figure 2:
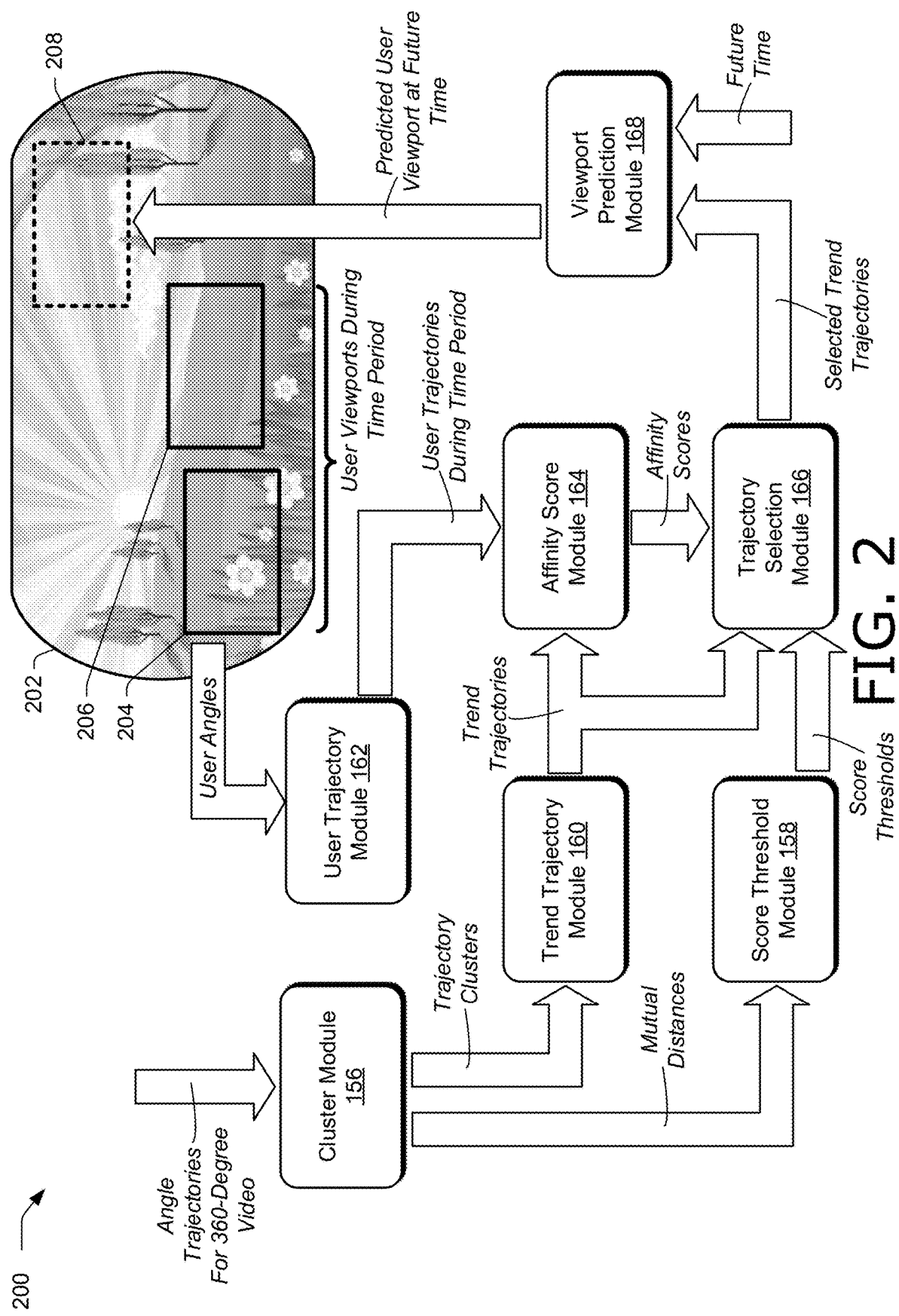
FIG. 2 illustrates an example system usable for trajectory-based viewport prediction for 360-degree videos in accordance with one or more aspects of the disclosure.

FIG. 2 illustrates an example system 200 usable for trajectory-based viewport prediction for 360-degree videos in accordance with one or more aspects of the disclosure. In this implementation, system 200 includes the modules of video application 152 as described in FIG. 1, e.g., angle trajectory module 154, which includes cluster module 156, score threshold module 158, and trend trajectory module 160. The system 200 also includes user trajectory module 162, affinity score module 164, trajectory selection module 166, and viewport prediction module 168 of the video application 152. System 200 is one example of video system 120 that can be constructed using the modules of video application 152. For instance, signals can be redefined, and modules can be modified, combined, divided, added, or removed to form a modified system, without altering the functionality of system 200. Accordingly, such modified systems are considered to be within the scope of the disclosure.

Furthermore, for simplicity, system 200 is limited to the modules of video application 152 and a description of some of their interconnects. System 200 can, however, include any suitable signals and communications between modules omitted for simplicity. Such signals may include system clocks, counters, timestamps of a 360-degree video (e.g., a timeline, chapter indicator, scene number, etc.), angle type indicators, trajectory cluster designators (e.g., angle types of a trajectory cluster, cluster identification numbers, etc.), reset signals, and the like.

System 200 can be implemented on any suitable device or devices. In one example, system 200 is implemented on one computing device (e.g., computing device 104 or computing device 106 in FIG. 1). In another example, system 200 is implemented on more than one computing device. For instance, parts of system 200 can be implemented by a first computing device, such as computing device 104 in FIG. 1, and other parts of system 200 can be implemented by an additional computing device, such as computing device 106. In one example, a server implements parts of system 200, such as server 126 in FIG. 1. A server can be remote, e.g., because it is not collocated with another computing device, such as computing device 106. A server may be configured to receive signals of system 200 from a computing device (e.g., computing device 104), process the received signals, such as with video support system 128, and transmit results of the processing back to the computing device. Hence, the video support system 128 of server 126 in FIG. 1 may include system 200. In one example, a server implements cluster module 156, trend trajectory module 160, and score threshold module 158, and a client computing device (e.g., computing device 106) implements user trajectory module 162, affinity score module 164, trajectory selection module 166, and viewport prediction module 168.

In one example, the modules of system 200 are executed during a display of a 360-degree video (e.g., while a user is viewing the 360-degree video). Additionally or alternatively, some of the modules of system 200 may be executed during a display of a 360-degree video, and other modules of system 200 can be executed prior to the display of the 360-degree video. For instance, cluster module 156, trend trajectory module 160, and score threshold module 158 may be implemented prior to the display of a 360-degree video to generate trajectory clusters, trend trajectories, and score thresholds, respectively, which may be used during the display of the 360-degree video by user trajectory module 162, affinity score module 164, trajectory selection module 166, and viewport prediction module 168 to predict a future viewport for a user viewing the 360-degree video.

In the example in FIG. 2, a 360-degree video 202 depicts a landscape scene, and viewports 204 and 206 depict viewports for a user during a time period of the 360-degree video 202. For instance, during a time period the 360-degree video 202 is played (e.g., delivered or served), a user has viewed the content of the 360-degree video 202 in viewports 204 and 206. Viewport 208 is a viewport predicted by system 200 for the user viewing the 360-degree video 202, and corresponds to a predicted viewing direction of the 360-degree video 202 for the user at a later time (e.g., a future time) relative to the time period over which the user views the 360-degree video 202 via the viewports 204 and 206.

Cluster module 156 obtains angle trajectories for the 360-degree video 202, such as trajectories of yaw angles, trajectories of pitch angles, and trajectories of roll angles. These angle trajectories determine viewports of the 360-degree video 202 for viewers of the 360-degree video 202, such as users who have previously viewed the 360-degree video 202. For instance, the angles can be sampled at time instances of the 360-degree video 202, and the angles at the time instances can correspond to viewports of the 360-degree video at the time instances. In one example, a server maintains a database of angle trajectories for 360-degree video (e.g., server 126 in FIG. 1), and system 200 obtains the angle trajectories from the server, such as periodically (e.g., once a month), in response to a new user viewing the 360-degree video 202 (e.g., a new user presently viewing the 360-degree video 202 or a new user whose user angles have been added to the database of angle trajectories).

Cluster module 156 clusters the angle trajectories into trajectory clusters based on mutual distances between pairs of the trajectories. For instance, cluster module 156 may include a spectral clustering algorithm that receives as input mutual distances or affinity scores determined from the mutual distances and generates trajectory clusters that include trajectories of angles. To cluster the angle trajectories into trajectory clusters, cluster module 156 may require that pairs of trajectories belonging to a trajectory cluster satisfy a distance constraint, such as their mutual distances being less than a distance threshold or their affinity scores being greater than a threshold affinity score. In one example, cluster module 156 clusters trajectories for yaw angles, pitch angles, and roll angles separately, so that a trajectory cluster determined by cluster module 156 is for a given type of angle (e.g., yaw angles). Hence, cluster module 156 may assign an identification to each trajectory cluster that identifies and describes the trajectory cluster, such as including a type of angle represented by the trajectory cluster, a number of trajectories in the trajectory cluster, statistics of the mutual distances or affinity scores for pairs of trajectories in the trajectory cluster, user identifiers for the trajectories in the trajectory cluster, combinations thereof, and the like. Cluster module 156 provides trajectory clusters to trend trajectory module 160, including trajectories of the trajectory clusters and any suitable identification of the trajectory clusters. Cluster module 156 also provides mutual distances of pairs of trajectories for each trajectory cluster to score threshold module 158. Each mutual distance between a pair of trajectories P and Q can include mutual distance measures D(P,Q) and D(Q,P), as described above.

Trend trajectory module 160 receives trajectory clusters from cluster module 156 and determines, for each trajectory cluster, a respective trend trajectory for the trajectory cluster that represents the trajectories belonging to the trajectory cluster. Trend trajectory module 160 can determine trend trajectories for the trajectory clusters in any suitable way. In one example, trend trajectory module 160 divides the 360-degree video 202 into time intervals, and for each time interval, determines a function that fits one or more of the trajectories of the trajectory cluster. For instance, trend trajectory module 160 may determine a polynomial that matches the trajectories of a trajectory cluster for each time interval by minimizing a distance function between the trajectories of the trajectory cluster and the polynomial over choices of polynomial coefficients, such as a mean-squared error distance measure that is subject to a boundary constraint to ensure continuity of the trend trajectory at the boundaries of the time intervals. Hence, trend trajectory module 160 may determine a trend trajectory as a piecewise polynomial function.

In one example, trend trajectory module 160 determines a trend trajectory for a trajectory cluster based on multiple trajectories of a trajectory cluster, such as all the trajectories belonging to the trajectory cluster. Additionally or alternatively, when reduced processing time is desired, such as during the viewing of the 360-degree video 202 in which system 200 uses the trend trajectories to predict future viewport 208, trend trajectory module 160 may determine a trend trajectory for a trajectory cluster based on one of the trajectories of a trajectory cluster, such as by selecting a single trajectory and fitting a polynomial function to the single trajectory at each time interval of the 360-degree video. Trend trajectory module 160 provides trend trajectories for the trajectory cluster (e.g., a different trend trajectory for each trajectory cluster) to affinity score module 164 and trajectory selection module 166.

Score threshold module 158 receives mutual distances from cluster module 156. For instance, score threshold module 158 receives, for each trajectory cluster identified by cluster module 156, mutual distances of pairs of trajectories belonging to the trajectory cluster. For each trajectory cluster, score threshold module 158 determines a score threshold based on the mutual distances of pairs of trajectories belonging to the trajectory cluster.

Score threshold module 158 can determine score thresholds based on the mutual distances in any suitable way. In one example, score threshold module 158 determines affinity scores based on the mutual distances as described above, and sets the score threshold for a trajectory cluster to the minimum affinity score among the affinity scores computed from the mutual distances for the pairs of trajectories belonging to the trajectory cluster. Additionally or alternatively, score threshold module 158 can determine, for each trajectory cluster a maximum mutual distance among the mutual distances of the pairs of trajectories belonging to the trajectory cluster. Score threshold module 158 may compute an affinity score for this maximum mutual distance, and set the score threshold for the trajectory cluster to the affinity score computed from the maximum mutual distance. Hence, the score threshold module 158 can determine a score threshold for each trajectory cluster that represents a minimum affinity score that a pair of trajectories must have to belong to the trajectory cluster, or a maximum mutual distance that a pair of trajectories can have to belong to the trajectory cluster. Score threshold module 158 provides score thresholds for the trajectory clusters to trajectory selection module 166.

User trajectory module 162 obtains, during a display of the 360-degree video 202, user angles for a time period of the 360-degree video 202 being displayed (e.g., user trajectories of the user angles). The user angles correspond to viewports of the 360-degree video for a user during the time period, including viewport 204 and viewport 206. User trajectory module 162 may record a trajectory of yaw angles, a trajectory of pitch angles, and a trajectory of roll angles for a user as the user views the 360-degree video 202 over the time period. User trajectory module 162 provides the user trajectories recorded during the time period to affinity score module 164.

Affinity score module 164 receives user trajectories from user trajectory module 162 and trend trajectories from trend trajectory module 160, and computes affinity scores between the user trajectories and the trend trajectories. Affinity score module 164 may compute affinity scores separately for yaw angles, pitch angles, and roll angles. For instance, affinity score module 164 may compute affinity scores between a user trajectory for a yaw angle and trend trajectories that represent trajectory clusters for yaw angles. Affinity score module 164 may also compute affinity scores between a user trajectory for a pitch angle and trend trajectories that represent trajectory clusters for pitch angles. Affinity score module 164 may also compute affinity scores between a user trajectory for a roll angle and trend trajectories that represent trajectory clusters for roll angles.

Affinity score module 164 can compute affinity scores in any suitable way. In one example, for a user trajectory U including angles over the time period $[0;T_n]$ and a trend trajectory R, affinity score module 164 computes the mutual distance between the user trajectory and the trend trajectory evaluated over the time period, $D(U, R[0;T_n])$ and $D(R[0;T_n], U)$. Affinity score module 164 determines the affinity score from the mutual distance computations according to $$K(U, R[0; T_n]) = e^{-\frac{D(U,R[0;T_n])D(R[0;T_n],U)}{2\sigma^2}}$$

where, as described above, σ is a scaling parameter, such as ten. Affinity score module 164 provides a respective affinity score for each trajectory cluster to trajectory selection module 166.

Trajectory selection module 166 receives affinity scores for each trajectory cluster from affinity score module 164, and score thresholds for each trajectory cluster from score threshold module 158, and selects trend trajectories to represent the movement of the user viewing the 360-degree video 202. For instance, trajectory selection module 166 can select a first trend trajectory for a yaw angle, a second trend trajectory for a pitch angle, and a third trend trajectory for a roll angle from the trend trajectories based on the affinity scores and the score thresholds.

The trajectory selection module 166 can select trend trajectories in any suitable way. In one example, trajectory selection module 166 selects the trend trajectories for the different types of angles having the highest affinity scores (e.g., the trend trajectories corresponding to the trajectory clusters with the highest affinity scores computed by affinity score module 164). For instance, among trend trajectories for yaw angles, trajectory selection module 166 can select as the first trend trajectory for a yaw angle the trend trajectory corresponding to the trajectory cluster for yaw angles with a highest affinity score. Among trend trajectories for pitch angles, trajectory selection module 166 can select as the second trend trajectory for a pitch angle the trend trajectory corresponding to the trajectory cluster for pitch angles with a highest affinity score. Among trend trajectories for roll angles, trajectory selection module 166 can select as the third trend trajectory for a roll angle the trend trajectory corresponding to the trajectory cluster for roll angles with a highest affinity score.

In one example, trajectory selection module 166 may apply a selection constraint in which, for a trend trajectory to be selected by trajectory selection module 166, the affinity score determined by the affinity score module 164 for the trajectory cluster represented by the trend trajectory must be greater than the score threshold for the trajectory cluster determined by the score threshold module 158. If a trend trajectory cannot be found to satisfy the selection constraint (e.g., the score threshold is greater than the affinity score for the trajectory cluster with a highest affinity score), trajectory selection module 166 may report to the user that their user trajectories do not match any trajectories on record for the 360-degree video 202. Additionally or alternatively, if a trend trajectory cannot be found to satisfy the selection constraint, trajectory selection module 166 may bypass the selection constraint and select the user trajectory representing the trajectory cluster with the highest affinity score. In one example, trajectory selection module 166 is configured to bypass the selection constraint based on receiving a user input, such as a user input to override the selection constraint (e.g., an "override" button on a head-mounted display for a virtual realty environment of the 360-degree video 202 that indicates to predict a user viewport using the best data available even if a selection constraint cannot be satisfied with the available data).

Trajectory selection module 166 provides selected trend trajectories to viewport prediction module 168. In one example, trajectory selection module 166 provides a first trend trajectory for a yaw angle, a second trend trajectory for a pitch angle, and a third trend trajectory for a roll angle to viewport prediction module 168.

Viewport prediction module 168 receives trend trajectories from trajectory selection module 166 (e.g., trend trajectories that system 200 determines are a best fit to the user trajectories over the time period of viewing the 360-degree video 202), and predicts a user viewport for a future time. The future time is a later time than times of the time period for which the user angles are recorded by user trajectory module 162. For instance, the future time is a later time than the times corresponding to the viewports 204 and 206.

Viewport prediction module 168 can predict a user viewport for a future time in any suitable way. In one example, viewport prediction module 168 evaluates a first trend trajectory for a yaw angle, a second trend trajectory for a pitch angle, and a third trend trajectory for a roll angle at the future time to determine predicted yaw, pitch, and roll angles, respectively. The predicted angles are used to determine the future viewport 208, a predicted user viewport at the future time.

Accordingly, system 200 can accurately predict a user viewport for long-term time horizons (e.g., 10-15 seconds) that correspond to a device's video buffer delay, so that the 360-degree video 202 can be efficiently delivered to a device and viewed without undesirable transitions in quality as the user changes the viewport of the 360-degree video 202, such as from viewport 204 to viewport 208. In one example, system 200 sends a request for content of the 360-degree video 202 corresponding to the future viewport 208, such as request to a server to deliver the content corresponding to the future viewport 208 at a higher quality (e.g., a higher encoder rate) than other portions of the 360-degree video 202.

In one example, system 200 separately processes different types of angles. For instance, system 200 may separate trajectory clusters, trend trajectories, and user trajectories for yaw angles, pitch angles, and roll angles. System 200 may predict a yaw angle for a user viewport from the trajectory clusters, trend trajectories, and user trajectories for yaw angles, a pitch angle for a user viewport from the trajectory clusters, trend trajectories, and user trajectories for pitch angles, and a roll angle for a user viewport from the trajectory clusters, trend trajectories, and user trajectories for roll angles.

Additionally or alternatively, system 200 can jointly process angles for yaw, pitch, and roll. For instance, system 200 may define a joint angle π that simultaneously represents two or more angles, such as $$\pi = \begin{bmatrix} \varphi \\ \omega \\ \theta \end{bmatrix}$$

where φ denotes a yaw angle, ω denotes a pitch angle, and θ denotes a roll angle. System 200 may determine trajectory clusters for the joint angle π, and match user trajectories of the joint angle to the trajectory clusters by comparing the user trajectories to trend trajectories of the trajectory clusters for the joint angle. Once system 200 selects a trend trajectory representing the joint angle for a user, the system 200 can predict the user's viewport by evaluating the selected trend trajectory representing the joint angle at a future time. By processing joint angles, system 200 may be able to exploit dependencies between angles and better match user movements to a trajectory cluster, increasing the reliability of system 200 and extending the time horizons over which system 200 can accurately predict a user viewport.

The systems described herein constitute an improvement over conventional systems that predict a user viewport based on a user's movement without regard to how other users viewed content of the 360-degree video, or that rely on second-order-statistics that do not capture the information needed to accurately predict a user viewport over a long-term time horizon. In contrast, the systems described herein match a new user's movement and viewing direction during the display of a 360-degree video to trajectories of yaw, pitch, and roll angles representing users who have previously viewed the 360-degree video. Since users tend to consume content of a 360-degree video in similar ways, the systems described herein can accurately predict the new user's viewport at a future time by evaluating the trajectories of yaw, pitch, and roll angles at the future time. Unlike conventional systems, the systems described herein can predict user viewports for long-term time horizons (e.g., 10-15 seconds), and therefore can fill a video buffer with usable content. Accordingly, the systems described herein can be used to efficiently deliver a 360-degree video with viewport-based adaptive streaming methods so that the 360-degree video can be viewed without undesirable transitions in quality as the user changes the viewport of the 360-degree video over time.

Example Procedures

Figure 3:
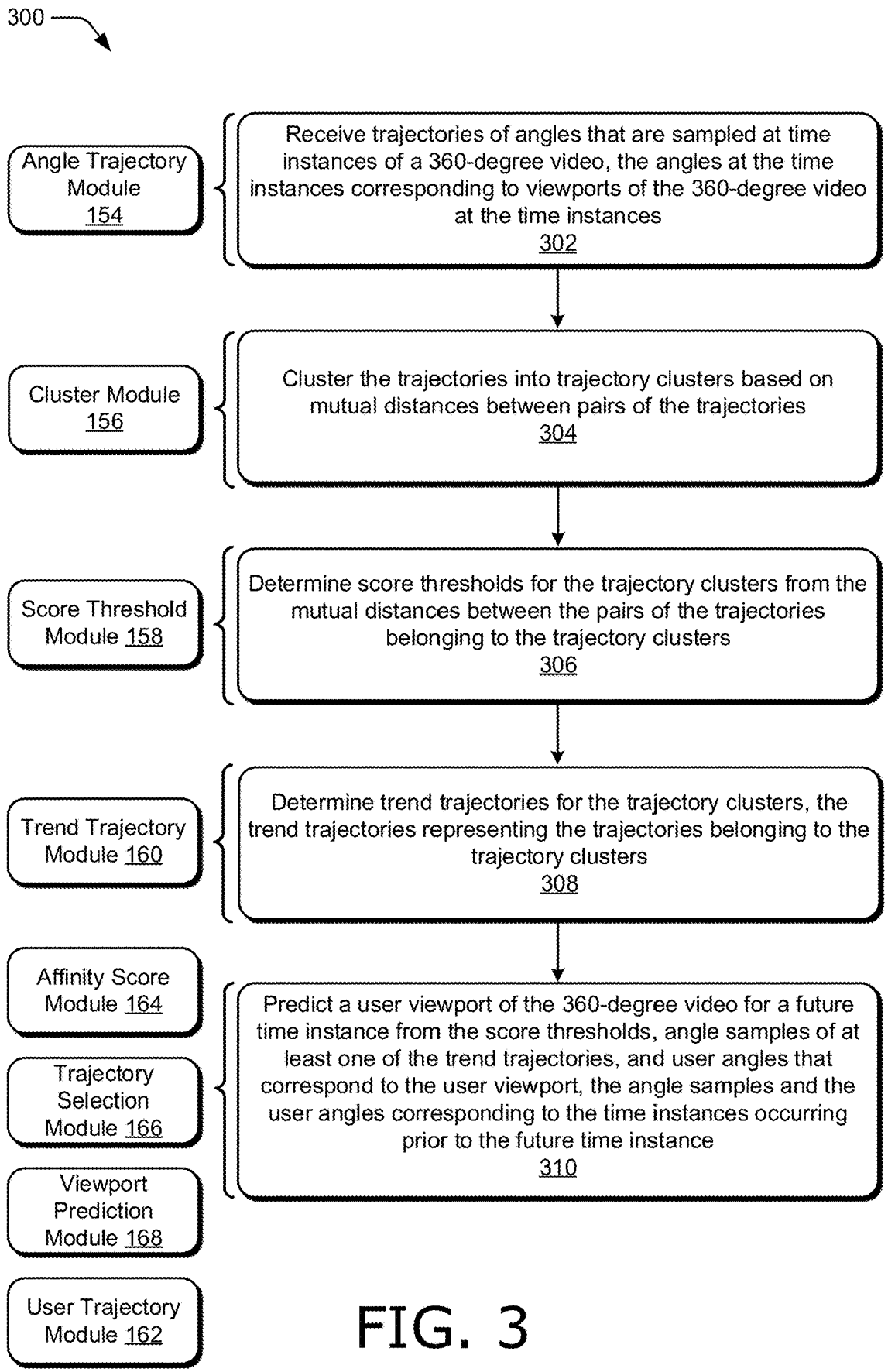
FIG. 3 illustrates a flow diagram depicting an example procedure in accordance with one or more aspects of the disclosure.

FIG. 3 illustrates an example procedure 300 for trajectory-based viewport prediction for 360-degree videos in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104, computing device 106, or server 126 of FIG. 1 that makes use of a video system, such as system 200 or video system 120. A video system implementing procedure 300 may be an independent application that has been installed on the computing device, a service hosted by a service provider that is accessible by the computing device, a plug-in module to the computing device, or combinations thereof.

Trajectories of angles that are sampled at time instances of the 360-degree video are received (block 302). In one example, angle trajectory module 154 receives trajectories of angles that are sampled at time instances of the 360-degree video. The angles at the time instances correspond to viewports of a 360-degree video at the time instances. The angles can include, at each time instance, at least one of a yaw angle, a pitch angle, or a roll angle. In one example, the trajectories include separate trajectories for different ones of the angles, such as trajectories for yaw angles, trajectories for pitch angles, and trajectories for roll angles. Additionally or alternatively, the trajectories can include a trajectory for a joint angle that simultaneously represents multiple ones of the angles, such as a joint angle representing a yaw angle, a pitch angle, and a roll angle.

In one example, the trajectories include a trajectory for an angle determined from at least one of a yaw angle, a pitch angle, or a roll angle. For instance, coordinates on a sphere can be represented in any suitable way based on yaw, pitch, and roll angles, such as by using quaternions components. Hence, any angle coordinate representation derived from yaw, pitch, and roll angles can be used to determine an angle having a trajectory obtained by angle trajectory module 154.

The trajectories are clustered into trajectory clusters based on mutual distances between pairs of the trajectories (block 304). In one example, cluster module 156 clusters the trajectories into trajectory clusters based on mutual distances between pairs of the trajectories. For instance, cluster module 156 can cluster the trajectories with a spectral clustering algorithm that receives affinity scores for pairs of trajectories that are calculated from the mutual distances between the pairs of trajectories.

Score thresholds for the trajectory clusters are determined from the mutual distances between the pairs of the trajectories belonging to the trajectory clusters (block 306). In one example, score threshold module 158 determines score thresholds for the trajectory clusters from the mutual distances between the pairs of the trajectories belonging to the trajectory clusters.

In one example, determining the score thresholds for the trajectory clusters includes determining, for each trajectory cluster, a maximum one of the mutual distances between the pairs of the trajectories belonging to each trajectory cluster. For each trajectory cluster, a score threshold is generated based on the maximum one of the mutual distances for the trajectory cluster, such as by computing an affinity score from the maximum one of the mutual distances.

Trend trajectories are determined for the trajectory clusters (block 308). The trend trajectories represent the trajectories belonging to the trajectory clusters. In one example, trend trajectory module 160 determines trend trajectories for the trajectory clusters, the trend trajectories representing the trajectories belonging to the trajectory clusters. Determining the trend trajectories for the trajectory clusters can include determining time intervals of the 360-degree video. For each time interval, polynomial coefficients are determined for each trajectory cluster based on the angles in the trajectories of the trajectory cluster during the time interval. Determining the polynomial coefficients can include minimizing a difference function of the angles and the polynomial functions over the polynomial coefficients subject to a boundary constraint on the polynomial functions at boundaries of the time intervals. For each trajectory cluster, a union is formed over the time intervals of polynomial functions that have the polynomial coefficients. Additionally or alternatively, trend trajectory module 160 can determine trend trajectories for the trajectory clusters by determining, for each trajectory cluster of the trajectory clusters, a centroid trajectory (e.g., a mean trajectory), a median trajectory, or combinations thereof.

A user viewport of the 360-degree video is predicted for a future time instance from the score thresholds, angle samples of at least one of the trend trajectories, and user angles that correspond to the user viewport (block 310). The angle samples and the user angles correspond to the time instances occurring prior to the future time instance. In one example, viewport prediction module 168 predicts a viewport of the 360-degree video for a future time instance from trend trajectories selected by trajectory selection module 166, and trajectory selection module 166 selects the trend trajectories based on affinity scores computed by affinity score module 164 between user trajectories of the user angles and the trend trajectories. User trajectory module 162 can obtain the user angles (e.g., user trajectories of user angles).

In one example, the user angles and the angles correspond to different user-viewings of the 360-degree video. For instance, the user angles may correspond to a current viewing of the 360-degree video by a new user, and some of the angles may correspond to previous viewings by different users of the 360-degree video. Additionally or alternatively, the user angles and the angles may correspond to a shared-viewing of the 360-degree video. For instance, multiple players may be simultaneously immersed in a virtual reality environment of a video game represented by the 360-degree video. The user angles may correspond to one of the multiple players, and the angles may correspond to other players of the multiple players.

Figure 4:
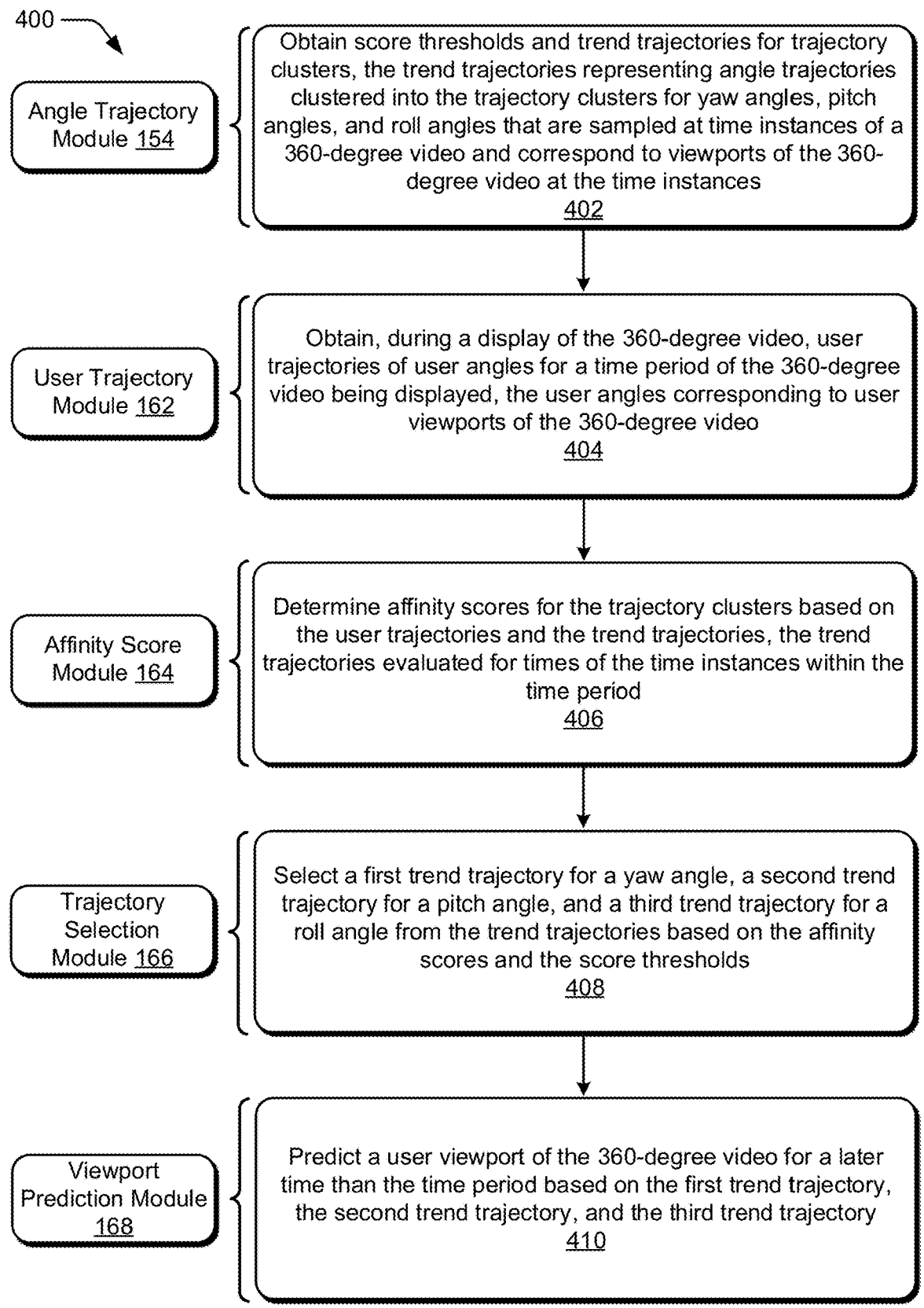
FIG. 4 illustrates a flow diagram depicting an example procedure in accordance with one or more aspects of the disclosure.

FIG. 4 illustrates an example procedure 400 for trajectory-based viewport prediction for 360-degree videos in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104, computing device 106, or server 126 of FIG. 1 that makes use of a video system, such as system 200 or video system 120. A video system implementing procedure 400 may be an independent application that has been installed on the computing device, a service hosted by a service provider that is accessible by the computing device, a plug-in module to the computing device, or combinations thereof.

Score thresholds and trend trajectories for trajectory clusters are obtained (block 402). The trend trajectories represent angle trajectories clustered into the trajectory clusters for yaw angles, pitch angles, and roll angles that are sampled at time instances of a 360-degree video. The angles correspond to viewports of the 360-degree video at the time instances. In one example, angle trajectory module 154 obtains score thresholds and trend trajectories for trajectory clusters, the trend trajectories representing angle trajectories clustered into the trajectory clusters for yaw angles, pitch angles, and roll angles that are sampled at time instances of a 360-degree video and correspond to viewports of the 360-degree video at the time instances.

Angle trajectory module 154 can obtain score thresholds and trend trajectories in any suitable way. In one example, the score thresholds and trend trajectories are pre-computed, and angle trajectory module 154 obtains the pre-computed score thresholds and trend trajectories from a server, such as prior to a display of the 360-degree video. Additionally or alternatively, obtaining the score thresholds and the trend trajectories can include generating the score thresholds and the trend trajectories. For instance, cluster module 156 may cluster the angle trajectories into trajectory clusters, score threshold module 158 may determine score thresholds for the trajectory clusters, and trend trajectory module 160 may determine the trend trajectories for the trajectory clusters, such as during a display of the 360-degree video to be used during the display of the 360-degree video.

During a display of the 360-degree video, user trajectories of user angles for a time period of the 360-degree video being displayed are obtained (block 404). The user angles correspond to user viewports of the 360-degree video. In one example, user trajectory module 162 obtains, during a display of the 360-degree video, user trajectories of user angles for a time period of the 360-degree video being displayed, the user angles corresponding to user viewports of the 360-degree video.

Affinity scores for the trajectory clusters are determined based on the user trajectories and the trend trajectories (block 406). The trend trajectories are evaluated for times of the time instances within the time period. In one example, affinity score module 164 determines affinity scores for the trajectory clusters based on the user trajectories and the trend trajectories, the trend trajectories evaluated for times of the time instances within the time period. The affinity score module 164 can be configured to determine the affinity scores based on mutual distances between the user trajectories and the trend trajectories.

A first trend trajectory for a yaw angle, a second trend trajectory for a pitch angle, and a third trend trajectory for a roll angle are selected from the trend trajectories based on the affinity scores and the score thresholds (block 408). In one example, trajectory selection module 166 selects a first trend trajectory for a yaw angle, a second trend trajectory for a pitch angle, and a third trend trajectory for a roll angle from the trend trajectories based on the affinity scores and the score thresholds. The trajectory selection module 166 can be configured to select at least one of the first trend trajectory, the second trend trajectory, or the third trend trajectory based on the affinity scores being greater than the score thresholds for the trajectory clusters corresponding to the first trend trajectory, the second trend trajectory, or the third trend trajectory.

In one example, the trajectory selection module 166 can be configured to select one trajectory of the first trend trajectory, the second trend trajectory, or the third trend trajectory based on the user trajectory being closer to the one trajectory than other trajectories of the trend trajectories. Additionally or alternatively, the trajectory selection module 166 can be further configured to select the one trajectory based on an affinity score for a trajectory cluster that includes the one trajectory not satisfying a constraint based on comparing the affinity score to a score threshold for the trajectory cluster.

A user viewport of the 360-degree video is predicted for a later time than the time period (block 410). The user viewport can be predicted based on the first trend trajectory, the second trend trajectory, and the third trend trajectory. In one example, viewport prediction module 168 predicts a user viewport of the 360-degree video for a later time than the time period based on the first trend trajectory, the second trend trajectory, and the third trend trajectory. The viewport prediction module 168 can be configured to predict the user viewport by evaluating the first trend trajectory, the second trend trajectory, and the third trend trajectory at the later time. In one example, the viewport prediction module 168 is configured to send a request for content of the 360-degree video corresponding to the user viewport, such as a request to a server for the content.

In one example, the viewport prediction module 168 is configured to determine a time horizon based on the time period and the later time. For instance, the viewport prediction module 168 may determine the time horizon from a difference in time between the later time and a time of the time period, such as a current time or a latest time of the time period. The viewport prediction module 168 may determine a percentage of storage of a video buffer corresponding to the time horizon. For instance, viewport prediction module 168 may determine a percentage of storage of a video buffer based on the amount of memory needed to store the 360-degree video over the time horizon.

Figure 5:
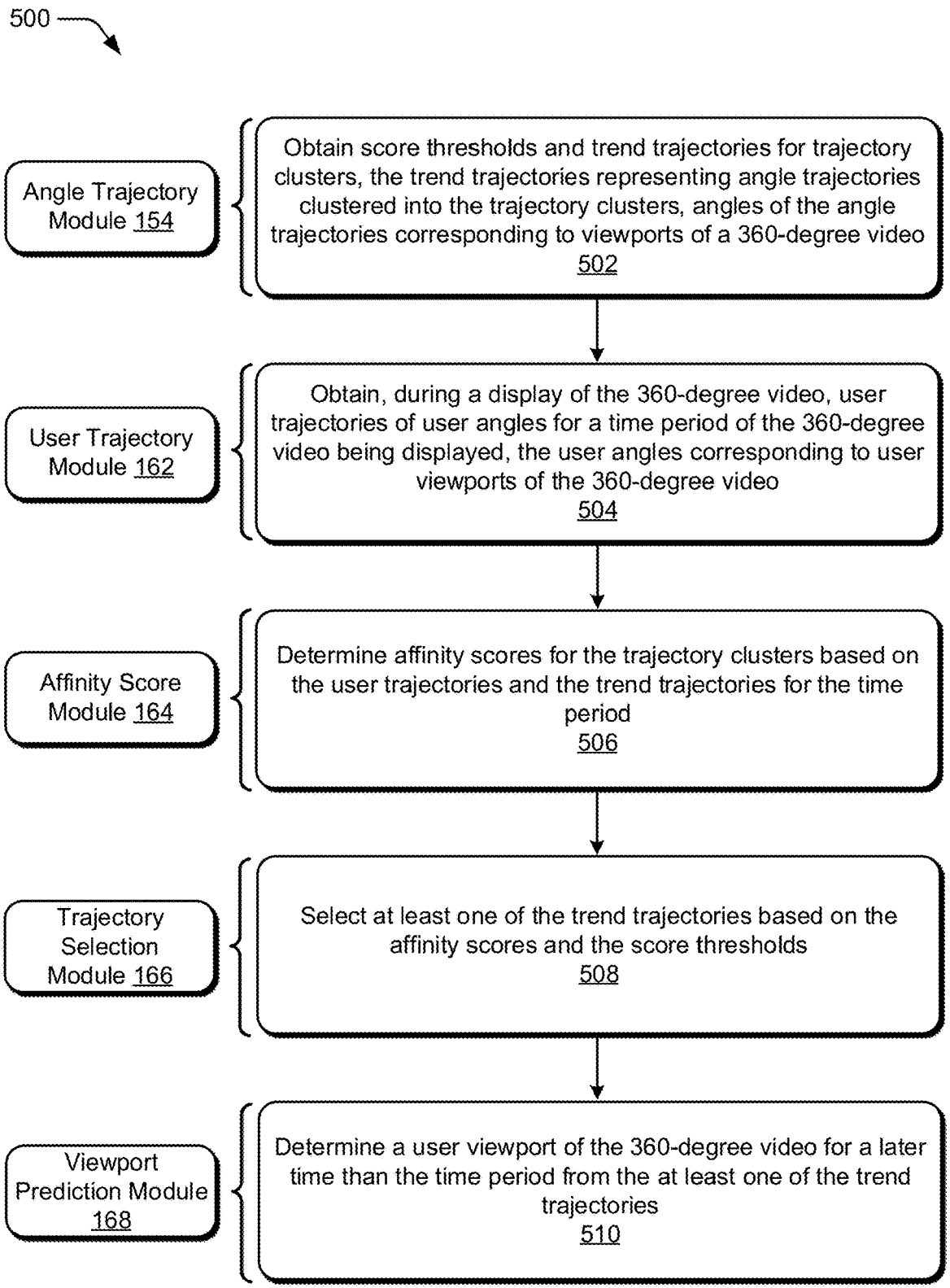
FIG. 5 illustrates a flow diagram depicting an example procedure in accordance with one or more aspects of the disclosure.

FIG. 5 illustrates an example procedure 500 for trajectory-based viewport prediction for 360-degree videos in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104, computing device 106, or server 126 of FIG. 1 that makes use of a video system, such as system 200 or video system 120. A video system implementing procedure 500 may be an independent application that has been installed on the computing device, a service hosted by a service provider that is accessible by the computing device, a plug-in module to the computing device, or combinations thereof.

Score thresholds and trend trajectories for trajectory clusters are obtained (block 502). The trend trajectories represent angle trajectories clustered into the trajectory clusters, angles of the angle trajectories corresponding to viewports of a 360-degree video. In one example, angle trajectory module 154 obtains score thresholds and trend trajectories for trajectory clusters, the trend trajectories representing angle trajectories clustered into the trajectory clusters, angles of the angle trajectories corresponding to viewports of a 360-degree video.

Angle trajectory module 154 can obtain score thresholds and trend trajectories in any suitable way. In one example, the score thresholds and trend trajectories are pre-computed, and angle trajectory module 154 obtains the pre-computed score thresholds and trend trajectories from a server. Additionally or alternatively, obtaining the score thresholds and the trend trajectories can include generating the score thresholds and the trend trajectories. For instance, cluster module 156 may cluster the angle trajectories into trajectory clusters, score threshold module 158 may determine score thresholds for the trajectory clusters, and trend trajectory module 160 may determine the trend trajectories for the trajectory clusters.

During a display of the 360-degree video, user trajectories of user angles for a time period of the 360-degree video being displayed are obtained (block 504). The user angles correspond to user viewports of the 360-degree video. In one example, user trajectory module 162 obtains, during a display of the 360-degree video, user trajectories of user angles for a time period of the 360-degree video being displayed, the user angles corresponding to user viewports of the 360-degree video.

In one example, angle trajectory module 154 obtains the score thresholds and the trend trajectories responsive to a request for the display of the 360-degree video. Additionally or alternatively, angle trajectory module 154 can obtain the score thresholds and the trend trajectories during the display of the 360-degree video. In one example, for each trajectory cluster, a pair of the angle trajectories belonging to the trajectory cluster that have a larger mutual distance than other pairs of the angle trajectories belonging to the trajectory cluster are determined. Angle trajectory module 154 can determine a score threshold for each trajectory cluster based on the pair of the angle trajectories belonging to the trajectory cluster that have the largest mutual distance.

Affinity scores for the trajectory clusters are determined based on the user trajectories and the trend trajectories for the time period (block 506). In one example, affinity score module 164 determines affinity scores for the trajectory clusters based on the user trajectories and the trend trajectories for the time period. For instance, the trend trajectories are evaluated over the time period and used with the user trajectories to compute affinity scores, as described above.

At least one of the trend trajectories is selected based on the affinity scores and the score thresholds (block 508). In one example, trajectory selection module 166 selects at least one of the trend trajectories based on the affinity scores and the score thresholds. In one example, trajectory selection module 166 selects a first trend trajectory for a yaw angle, a second trend trajectory for a pitch angle, and a third trend trajectory for a roll angle from the trend trajectories based on the affinity scores and the score thresholds.

A user viewport of the 360-degree video is determined for a later time than the time period from the at least one of the trend trajectories (block 510). In one example, viewport prediction module 168 determines a user viewport of the 360-degree video for a later time than the time period from the at least one of the trend trajectories.

In one example, the video system ascertains whether a selection constraint is satisfied, such as by comparing the affinity scores and the score thresholds for the trajectory clusters. For instance, the video system may ascertain that a selection constraint is satisfied for a trajectory cluster if an affinity score is greater than the score threshold for the trajectory cluster. Responsive to the selection constraint not being satisfied, the video system may request new user trajectories of new user angles that may be matched to trajectory clusters. When the selection constraint is satisfied, however, the video system may select at least one of the trend trajectories and determine the user viewport.

The procedures described herein constitute an improvement over conventional methods that predict a user viewport based on a user's movement without regard to how other users viewed content of the 360-degree video, or that rely on second-order-statistics that do not capture the information needed to accurately predict a user viewport over a long-term time horizon. In contrast, the procedures described herein match a new user's movement during the display of a 360-degree video to trajectories of yaw, pitch, and roll angles determined from movement of users who have previously viewed the 360-degree video. Since users tend to consume content of a 360-degree video in similar ways, the procedures described herein can accurately predict the new user's viewport at a future time by evaluating the trajectories of yaw, pitch, and roll angles at the future time. Unlike conventional methods, the procedures described herein can predict user viewports for long-term time horizons (e.g., 10-15 seconds), and therefore can fill a video buffer with usable content. Accordingly, the procedures described herein can be used to efficiently deliver a 360-degree video with viewport-based adaptive streaming methods so that the 360-degree video can be viewed without undesirable transitions in quality as the user changes the viewport of the 360-degree video over time.

Example Results

Figure 6:
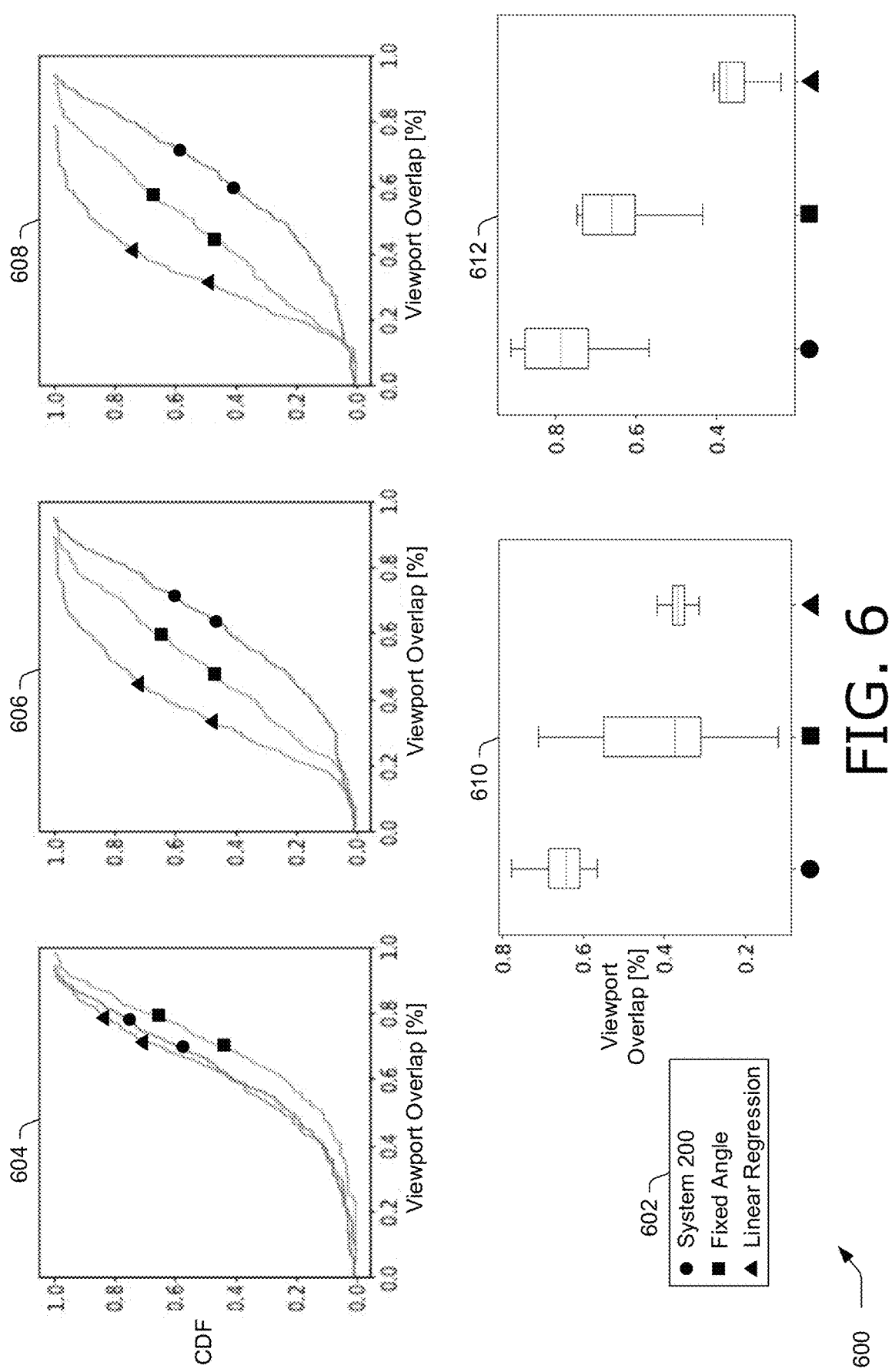
FIG. 6 illustrates example performance measures in accordance with one or more aspects of the disclosure.

FIG. 6 illustrates example performance measures 600 in accordance with one or more aspects of the disclosure. Performance measures 600 illustrate example results for three systems, including system 200 in FIG. 2, a naïve system (referred to as "fixed angle") that fixes the angle at time $T_n+T_h$ to the angle at time $T_n$ for time horizon $T_h$, and a modified linear regression system (referred to as "linear regression") as described in "Cub360: Exploiting cross-users behaviors for viewport prediction in 360 degree video adaptive streaming" in *IEEE International Conference on Multimedia and Expo*, 2018, by Y. Ban et al. In FIG. 6, results for system 200 are denoted with dark circles, results for the fixed angle system are denoted with dark squares, and results for the linear regression system are denoted with dark triangles, as illustrated in the key 602.

Performance measures 600 show example results determined for 16 different 360-degree videos. Each of the 360-degree videos are viewed by up to 61 users, of which 80% are used to determine trajectory clusters, and trend trajectories and score thresholds for the trajectory clusters. The remaining 20% of the viewers are used for viewport prediction by the systems being compared. Graphs 604, 606, and 608 illustrate the cumulative density function (CDF) of the average viewport overlap percentage (between predicted viewports and actual viewports for the users) for time horizons of 1 second, 5 seconds, and 10 seconds, respectively, averaged over all the users and the 16 different 360-degree videos. In these graphs, for a viewport overlap percentage on the x-axis, the corresponding point on the y-axis represents the percentage of users whose viewport overlap is smaller than the viewport overlap percentage on the x-axis. As an example, if the value on the x-axis for a curve is 0.8 and the corresponding value for the curve on the y-axis is 0.25, then 75% of the users have a viewport overlap percentage between their predicted viewport and their actual viewport greater than 80%.

For $T_h$=1 second, the results of graph 604 show that the three systems have similar performance. However, for longer-term time horizons of $T_h$=5 seconds and $T_h$=10 seconds, the results of graph 606 and 608 show that the system 200 significantly outperforms the fixed angle system and the linear regression system. Moreover, the results for system 200 are consistent for the different time horizons in graphs 604, 606, and 608, indicating that system 200 is accurately able to match a user's movements to other viewers' movements, and that the different users tend to consume the 360-degree videos in similar ways.

Illustrations 610 and 612 show box-plots for two of the 360-degree videos, respectively, for each of the three systems tested for a time horizon of $T_h$=5 seconds. The box-plots show statistics of the viewport overlap percentage across the users viewing the 360-degree videos. For instance, in each of the box-plots, the box (or rectangle) bottom corresponds to the $25^{th}$ percentile (called Q1) and the box top corresponds to the 75th percentile (called Q3). The dashed line inside a box is the median value. Upper and lower values for ranges of the data are indicated by upper and lower vertical lines extending from the boxes, respectively, and terminating in horizontal dashes. The horizontal dash for the upper vertical line indicates an upper value of the range of data and is calculated according to Q3+1.5·(Q3−Q1), and the horizontal dash for the lower vertical line indicates a lower value of the range of data, which is calculated according to Q1−1.5·(Q3−Q1).

Illustrations 610 and 612 show that statistically, system 200 outperforms the other two systems significantly. For instance, not only is the median performance for system 200 much better than the median performance values of the fixed angle system and the linear regression system, but also the distribution across the users indicates higher viewport overlap percentage for system 200 than for the other two systems.

Example Systems and Devices

FIG. 7 illustrates an example system 700 including an example computing device 702 that is representative of one or more computing systems and devices that can be utilized to implement the various techniques described herein. This is illustrated through inclusion of video system 120, system 200, video application 152, and video support system 128, which operate as described above. Computing device 702 may be, for example, a user computing device (e.g., computing device 104 or computing device 106), or a server device of a service provider, (e.g., server 126). Furthermore, computing device 702 may include an on-chip system, multiple computing devices, combinations thereof, or any other suitable computing device or computing system. Accordingly, FIG. 7 illustrates computing device 702 as one or more of a tablet, a laptop computer, a smart phone, smart eye glasses, and a camera, though these examples are illustrative and in no way are meant to limit the type or number of devices that may be represented by computing device 702.

The example computing device 702 includes a processing system 704, one or more computer-readable media 706, and one or more I/O interfaces 708 that are communicatively coupled to each other. Although not shown, computing device 702 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 704 is representative of functionality to perform one or more operations using hardware. Accordingly, processing system 704 is illustrated as including hardware elements 710 that may be configured as processors, functional blocks, and so forth. This may include implementation in hardware as an application specific integrated circuit or other logic device formed using one or more semiconductors. Hardware elements 710 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 134 in FIG. 1 are an example of processing system 704.

Computer-readable storage media 706 is illustrated as including memory/storage 712. Storage 136 in FIG. 1 is an example of memory/storage of memory/storage 712. Memory/storage 712 may include volatile media (such as random access memory (RAM)), nonvolatile media (such as read only memory (ROM), Flash memory, optical disks, magnetic disks, and so forth), or combinations thereof. Memory/storage 712 may include fixed media (e.g., RAM, ROM, a fixed hard drive, and so on) as well as removable media (e.g., Flash memory, a removable hard drive, an optical disc, and so forth). Computer-readable media 706 may be configured in a variety of other ways as further described below.

Input/output interfaces 708 are representative of functionality to allow a user to enter commands and information to computing device 702, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. In one example, computing device 702 includes speech recognition, identification, and synthesis functionalities, microphones, and speakers that allow computing device 702 to communicate with a user in a conversation, e.g., a user conversation. Accordingly, computing device 702 can recognize input as being a mouse input, stylus input, touch input, input provided through a natural user interface, and the like. Thus, computing device 702 can recognize multiple types of gestures including touch gestures and gestures provided through a natural user interface.

Examples of output devices include a display device (e.g., a monitor or projector), speakers, a printer, a network card, tactile-response device, and so forth. In one example, computing device 702 displays a 360-degree video, such as a virtual reality environment in which a user may be immersed and move to change the viewport of the 360-degree video. For instance, input/output interfaces 708 may include a display that can display a 360-degree video and can include any suitable type of display, such as a touchscreen, liquid crystal display, plasma display, head-mounted display, projector and screen, and the like. A touchscreen can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Thus, computing device 702 may be configured in a variety of ways as further described below to support user interaction.

Computing device 702 also includes applications 714. Applications 714 are representative of any suitable applications capable of running on computing device 702, and may include a web browser which is operable to access various kinds of web-based resources (e.g., assets, media clips, images, content, configuration files, services, user profiles, and the like). Applications 714 include video application 152, as previously described. Furthermore, applications 714 includes any applications supporting video system 120, system 200, and video support system 128.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 702. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 710, or combinations thereof. Computing device 702 may be configured to implement particular instructions and functions corresponding to the software and hardware modules. Accordingly, implementation of a module that is executable by computing device 702 as software may be achieved at least partially in hardware, e.g., through use of computer-readable storage media and hardware elements 710 of processing system 704. The instructions and functions may be executable/operable by one or more articles of manufacture (for example, one or more computing devices such as computing device 702 or processing systems such as processing system 704) to implement techniques, modules, and examples described herein.

The techniques described herein may be supported by various configurations of computing device 702 and are not limited to the specific examples of the techniques described herein. This functionality may also be implemented all or in part through use of a distributed system, such as over a "cloud" 716 via a platform 718. Cloud 716 includes and is representative of a platform 718 for resources 720. Platform 718 abstracts underlying functionality of hardware (e.g., servers) and software resources of cloud 716.

Resources 720 may include applications, data, or applications and data that can be utilized while computer processing is executed on servers that are remote from computing device 702. Resources 720 can also include services provided over the Internet, through a subscriber network, such as a cellular or Wi-Fi network, or combinations thereof. Generally, resources 720 may be licensed, purchased, or may be made freely available, (e.g., without authentication, license, or account-based access). Resources 720 can include asset store 722, which stores assets, such as 360-degree videos that may be accessed by computing device 702. The resources 720 can include any suitable combination of services and content, such as an on-line shopping service, an image editing service, an artwork drawing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets, including videos, ads, audio, multi-media streams, animations, digital images, digital artworks, web documents, web pages, applications, device applications, text documents, drawings, presentations, photographs (e.g., stock photographs), user profiles, user preferences, user data (e.g., images stored in an image gallery), maps, computer code, and the like.

Platform 718 may abstract resources and functions to connect computing device 702 with other computing devices. Platform 718 may also serve to abstract scaling of resources to provide a corresponding level of scale to encountered demand for resources 720 that are implemented via platform 718. Accordingly, in an interconnected device embodiment, implementation of functionality described herein may be distributed throughout system 700. For example, the functionality may be implemented in part on computing device 702 as well as via platform 718 that abstracts the functionality of cloud 716.

CONCLUSION

In one or more implementations, a digital medium environment includes at least one computing device. Systems, devices, and techniques are described herein for trajectory-based viewport prediction for 360-degree videos. A video system obtains trajectories of angles of users who have previously viewed a 360-degree video. The angles are used to determine the users' viewports of the 360-degree video, and may include trajectories for a yaw angle, a pitch angle, and a roll angle of a user's head recorded as the user views the 360-degree video. The video system clusters the trajectories of angles into trajectory clusters based on a mutual distance between pairs of trajectories, and for each trajectory cluster determines a trend trajectory and a score threshold. When a new user views the 360-degree video, the video system compares trajectories of angles of the new user to the trend trajectories, and selects trend trajectories for a yaw angle, a pitch angle, and a roll angle for the user based on the comparison and the score thresholds. Using the selected trend trajectories for yaw angle, pitch angle, and roll angle, the video system predicts viewports of the 360-degree video for the user for future times. Hence, the video system predicts a user's viewport of a 360-degree video based on patterns of past viewing behavior of the 360-degree video, e.g., how other users viewed the 360-degree video. Accordingly, the video system can accurately predict a user's viewport for long-term time horizons corresponding to video buffer delays, so that the 360-degree video can be efficiently delivered and viewed without undesirable transitions in quality as the user changes the viewport of the 360-degree video.

Although implementations of trajectory-based viewport prediction for 360-degree videos have been described in language specific to features and/or methods, the appended claims are not necessarily limited to the specific features or methods described. Rather, the specific features and methods are disclosed as example implementations of trajectory-based viewport prediction for 360-degree videos, and other equivalent features and methods are intended to be within the scope of the appended claims. Further, various different examples are described and it is to be appreciated that each described example can be implemented independently or in connection with one or more other described examples.

What is claimed is:

1. In a digital medium environment for viewport prediction of a video, a method implemented by a computing device, the method comprising:
   obtaining, by the computing device, trend trajectories for yaw angles, pitch angles, and roll angles that are sampled at time instances of a video and correspond to viewports of the video at the time instances;
   obtaining, by the computing device during a display of the video, user trajectories of user angles for a time period of the video being displayed, the user angles corresponding to user viewports of the video;
   determining, by the computing device, affinity scores for the trend trajectories based on the user trajectories;
   selecting, by the computing device, a first trend trajectory for a yaw angle, a second trend trajectory for a pitch angle, and a third trend trajectory for a roll angle from the trend trajectories based on the affinity scores; and
   predicting, by the computing device, a user viewport of the video for a later time than the time period based on the first trend trajectory, the second trend trajectory, and the third trend trajectory.

2. The method as described in claim 1, wherein the determining the affinity scores is based on mutual distances between the user trajectories and the trend trajectories.

3. The method as described in claim 1, wherein the selecting the at least one of the first trend trajectory, the second trend trajectory, or the third trend trajectory is based on the affinity scores being greater than the score thresholds for trajectory clusters corresponding to the first trend trajectory, the second trend trajectory, or the third trend trajectory.

4. The method as described in claim 1, wherein the selecting includes selecting one trajectory of the first trend trajectory, the second trend trajectory, or the third trend trajectory based on the user trajectory being closer to the one trajectory than other trajectories of the trend trajectories.

5. The method as described in claim 4, wherein the selecting the one trajectory is based on an affinity score for a trajectory cluster that includes the one trajectory not satisfying a constraint based on comparing the affinity score to a score threshold for the trajectory cluster.

6. The method as described in claim 1, wherein the predicting includes:
   determining a time horizon based on the time period and the later time; and
   determining a percentage of storage of a video buffer corresponding to the time horizon.

7. The method as described in claim 1, further comprising sending a request for content of the video corresponding to the user viewport.

8. A video system implemented by a computing device in a digital medium environment, the video system including modules implemented at least partially in hardware of the computing device, the video system comprising:
   an angle trajectory module to obtain trend trajectories for yaw angles, pitch angles, and roll angles that are sampled at time instances of video and correspond to viewports of the 360-degree video at the time instances;
   a user trajectory module to obtain, during a display of the video, user trajectories of user angles for a time period of the video being displayed, the user angles corresponding to user viewports of the video;
   an affinity score module to determine affinity scores for the trend trajectories based on the user trajectories;
   a trajectory selection module to select a first trend trajectory for a yaw angle, a second trend trajectory for a pitch angle, and a third trend trajectory for a roll angle based on the affinity scores; and a viewport prediction module to predict a user viewport of the video for a later time than the time period based on the first trend trajectory, the second trend trajectory, and the third trend trajectory.

9. The video system as described in claim 8, wherein the affinity score module is configured to determine the affinity scores based on mutual distances between the user trajectories and the trend trajectories.

10. The video system as described in claim 8, wherein the trajectory selection module is configured to select at least one of the first trend trajectory, the second trend trajectory, or the third trend trajectory based on the affinity scores being greater than the score thresholds for trajectory clusters corresponding to the first trend trajectory, the second trend trajectory, or the third trend trajectory.

11. The video system as described in claim 8, wherein the trajectory selection module is configured to select one trajectory of the first trend trajectory, the second trend trajectory, or the third trend trajectory based on the user trajectory being closer to the one trajectory than other trajectories of the trend trajectories.

12. The video system as described in claim 11, wherein the trajectory selection module is further configured to select the one trajectory based on an affinity score for a trajectory cluster that includes the one trajectory not satisfying a constraint based on comparing the affinity score to a score threshold for the trajectory cluster.

13. The video system as described in claim 8, wherein the viewport prediction module is configured to:
determine a time horizon based on the time period and the later time; and
determine a percentage of storage of a video buffer corresponding to the time horizon.

14. The video system as described in claim 8, wherein the viewport prediction module is configured to send a request for content of the 360-degree video corresponding to the user viewport.

15. In a digital medium environment for viewport prediction of a video, a system comprising:
means for obtaining trend trajectories for yaw angles, pitch angles, and roll angles that are sampled at time instances of a video and correspond to viewports of the video at the time instances;
means for obtaining, during a display of the video, user trajectories of user angles for a time period of the video being displayed, the user angles corresponding to user viewports of the video;
means for determining affinity scores for the trend trajectories based on the user trajectories;
means for selecting a first trend trajectory for a yaw angle, a second trend trajectory for a pitch angle, and a third trend trajectory for a roll angle from the trend trajectories based on the affinity scores; and
means for predicting a user viewport of the video for a later time than the time period based on the first trend trajectory, the second trend trajectory, and the third trend trajectory.

16. The system as described in claim 15, wherein the means for determining the affinity scores is based on mutual distances between the user trajectories and the trend trajectories.

17. The system as described in claim 15, wherein the means for selecting the at least one of the first trend trajectory, the second trend trajectory, or the third trend trajectory is based on the affinity scores being greater than the score thresholds for trajectory clusters corresponding to the first trend trajectory, the second trend trajectory, or the third trend trajectory.

18. The system as described in claim 15, wherein the means for selecting includes selecting one trajectory of the first trend trajectory, the second trend trajectory, or the third trend trajectory based on the user trajectory being closer to the one trajectory than other trajectories of the trend trajectories.

19. The system as described in claim 18, wherein the selecting the one trajectory is based on an affinity score for a trajectory cluster that includes the one trajectory not satisfying a constraint based on comparing the affinity score to a score threshold for the trajectory cluster.

20. The system as described in claim 15, wherein the predicting means includes:
means for determining a time horizon based on the time period and the later time; and
means for determining a percentage of storage of a video buffer corresponding to the time horizon.

* * * * *